(12) United States Patent
Tamura

(10) Patent No.: US 7,184,086 B2
(45) Date of Patent: Feb. 27, 2007

(54) CAMERA HAVING FLEXIBLE DISPLAY

(75) Inventor: Tomoaki Tamura, Hachioji (JP)

(73) Assignee: Konica Corporation, Tokyo (JP)

( * ) Notice: Subject to any disclaimer, the term of this patent is extended or adjusted under 35 U.S.C. 154(b) by 708 days.

(21) Appl. No.: 10/372,698

(22) Filed: Feb. 24, 2003

(65) Prior Publication Data
US 2003/0160892 A1 Aug. 28, 2003

(30) Foreign Application Priority Data
Feb. 25, 2002 (JP) .............................. 2002-047312
Mar. 15, 2002 (JP) .............................. 2002-072747

(51) Int. Cl.
H04N 5/222 (2006.01)

(52) U.S. Cl. ............. 348/333.06; 348/376; 348/333.13

(58) Field of Classification Search .................... None
See application file for complete search history.

(56) References Cited

U.S. PATENT DOCUMENTS

| 5,161,025 | A | * | 11/1992 | Nakao .................... 348/333.05 |
| 5,384,609 | A | * | 1/1995 | Ogawa et al. .............. 396/419 |
| 5,940,126 | A | * | 8/1999 | Kimura ...................... 348/294 |
| 6,311,076 | B1 | * | 10/2001 | Peuhu et al. ................. 455/566 |
| 7,050,835 | B2 | * | 5/2006 | Hack et al. .................. 455/566 |
| 2002/0090980 | A1 | * | 7/2002 | Wilcox et al. .............. 455/566 |
| 2003/0071800 | A1 | * | 4/2003 | Vincent et al. ............. 345/204 |

* cited by examiner

Primary Examiner—Ngoc-Yen Vu
Assistant Examiner—Hung Lam
(74) Attorney, Agent, or Firm—Cohen Pontani Lieberman & Pavane LLC

(57) ABSTRACT

A camera includes a columnar camera main body portion having a photographing lens, and a flexible display for displaying an image of an object to be photographed through the photographing lens, in which one end of the flexible display is attached to the camera main body portion, and which is provided so as to be taken-up into the camera main body portion.

3 Claims, 18 Drawing Sheets

CAMERA HAVING FLEXIBLE DISPLAY

BACKGROUND OF THE INVENTION

The present invention relates to a camera having a flexible display.

In a digital camera, there is a camera having a display to conduct a framing, a display of a photographed image, and a display of various kind of information. Generally, this display is a liquid crystal display, and fixed on the rear surface of the camera, or can be housed.

However, the liquid crystal display requires a space, and is a factor to hinder the downsizing of the camera.

SUMMARY OF THE INVENTION

The present invention is attained in view of the above-described problems, and an object of the present invention is to realize a camera which can be downsized.

The above-described object can be attained by any one of the following Structures (1)–(29).

(1) A camera which is characterized in that: a camera has a columnar camera main body portion having a photographing lens; a flexible display in which one end is attached to the camera main body portion, and which is provided so that the flexible display can be taken-up into the camera main body portion; and a grip portion attached to the other end of the display.

The flexible display is fed-out from the camera main body portion, and one hand holds the camera main body portion so that the display is in the stretched state, the other hand has the grip portion, and the framing is conducted by using the display and photographing is conducted.

In the case where the camera is not used, when the display is taken-up into the camera main body portion, the camera becomes a small size. Hereupon, in the present invention, as the flexible display, there is a display which is thin and light like as the paper, and in which, even when the power source is turned off, the display image is maintained, so-called electronic paper (e-paper).

Further, as a system of the electronic paper, although there is a system in which a cholesteric liquid crystal is used, a multi-color micro capsule is rotated, the liquid crystal layers of red, green and blue are superimposed, attraction and separation of toner between two layers is used, and the organic EL is light-emitted on the film, However, it is not limited to this.

Furthermore, as the camera, there is a digital camera using the image pick-up element such as a CCD, and a silver halide camera using the silver halide film. However, it is not limited to this.

(2) A camera described in Structure (1) which is characterized in that: it has the first detection means for detecting that the display taken-up into the camera main body portion is fed-out; the second detection means for detecting that the display is perfectly taken-up into the camera main body portion; and a control means for taking-in a signal of the first detection means and the second detection means, and for driving the display.

In the case where the first detection means which detects that the display taken-up into the camera main boy portion is fed-out, and the second detection means which detects that the display is perfectly taken-up into the camera main body portion, are provided, and it has a control means by which a signal of the first detection means and the second detection means is taken in, and the display is driven, when the control section takes in the signal of the first detection means and the second detection means, and from the condition that the display is perfectly taken into the camera main body portion, the display is fed-out, the display is driven, and further, when the control section stops the drive of the display when the display is perfectly taken into the camera main body portion, the power saving is attained.

(3) A camera described in Structure (1) or (2) which is characterized in that: an optical view finder is provided in the camera main body portion. Even in the condition that the display is taken-up into the camera main body portion, the photographing can be conducted by using the optical view finder.

(4) A camera described in Structure (3) which is characterized in that: a view finder light shielding means for shielding the light at any portion in an optical path of the optical view finder, or in an objective portion or an ocular portion is provided, and the control section takes in the signal of the first detection means, and drives the view finder light shielding means.

When a view finder light shielding means for shielding the light at any portion in the optical path of the optical view finder, or in the objective portion or the ocular portion is provided, and the control section takes in the signal of the first detection means, and drives the view finder light shielding means, the framing operation becomes clear.

(5) A camera described in any one of Structures (1) (4) which is characterized in that: a release is provided in any one of the camera main body portion or the grip portion.

The operability is good when the release is provided in any one of the camera main body portion or the grip portion.

(6) A camera described in any one of Structures (1)–(5) which is characterized in that: a take-up means for taking-up the display into the camera main body portion is provided, and after the display is fed-out, due to the change of the condition, the control section drives the take-up means.

In the state in which the display is fed-out, because a back light of the display and a display drive circuit are operated, the power consumption is large. When the take-up means for taking-up the display into the camera main body portion is provided, and after the display is fed-out, due to the change of the condition, the control section drives the take-up means, the power saving is attained.

(7) A camera described in Structure (6) which is characterized in that: the change of the condition is any one of a time when a predetermined period of time passes after the display is fed-out, a time when the mode changes to the power saving mode, a time when a predetermined period of time passes after the photographing, a time when the charging is started, a time when a battery cover is opened, or a time when a memory card cover is opened.

When the change of the condition is any one of a time when a predetermined period of time passes after the display is fed-out, a time when the mode changes to the power saving mode, a time when a predetermined period of time passes after the photographing, a time when the charging is started, a time when a battery cover is opened, or a time when a memory card cover is opened, the camera comes into the power saving.

(8) A camera described in any one of Structures (6) or (7) which is characterized in that: when the display is not perfectly taken-up in a predetermined period of time after a signal from the second detection means is taken in and the taking-up is started, the control section stops the taking-up and makes the camera come into the power saving mode.

In the case where the display is not perfectly taken-up in a predetermined period of time after a signal from the second detection means is taken in and the taking-up is started, when the control section stops the taking-up and makes the camera come into the power saving mode, the damage of the display can be prevented.

(9) A camera described in any one of Structures (1)–(8) which is characterized in that: a feed-out means for feeding out the display from the camera main body portion is provided, and after the display is taken-up, due to the change of the condition, the control section drives the feed-out means.

When the feed-out means for feeding out the display from the camera main body portion is provided, and after the display is taken-up, due to the change of the condition, the control section drives the feed-out means, it is easily understood by the large change of the appearance shape that the camera is moved to the photographing condition or the reproducing condition.

Further, also the image to be photographed, or the image to be reproduced can be confirmed through the display. Further, by housing the display at the time except the photographing condition or reproducing condition, the display can be protected from the flaws or dusts.

(10) A camera described in Structure (9) which is characterized in that: the change of the condition is any one of the time when an interval photographing is conducted, the time when a reserved photographing is conducted, the time when a trigger signal from the outside is inputted, or the time when an interval reproducing is conducted.

It is easily understood by the large change of the appearance shape that the camera comes into the photographing condition or the reproducing condition. Further, also the image to be photographed, or the image to be reproduced can be confirmed through the display.

Further, by housing the display at the time except the photographing condition or reproducing condition, the display can be protected from the flaws or dusts. Hereupon, the interval photographing means that the photographing is conducted at every predetermined time, and the interval reproducing means that image is reproduced at every predetermined time.

Further, in the interval reproducing, the image reproduced at every predetermined time may also be the same or different.

(11) A camera which is characterized in that: it has the camera main body portion having a photographing lens, and the display, a portion of which is attached to the camera main body portion, and which has the flexibility, and is formed collapsible.

The display formed collapsible is spread and the framing is conducted by using the display and the photographing is conducted. When the camera is not used, by collapsing the display, the camera becomes a small size.

Hereupon, as the flexible display in the present invention, there is the display which is thin and light like a paper, and in which the image is maintained even when the power source is turned off, so-called the electronic paper (e-paper).

Further, as the electronic paper system, there is a system using the cholesteric liquid crystal, a system in which a multi-color micro-capsule is rotated, a liquid crystal layer of red, green and blue are superimposed, a system using the attraction and separation of the toner between two layers, or a system in which the organic EL is light-emitted on the film. However, it is not limited to this.

Further, as the camera, there is a digital camera using the image pick-up element such as a CCD, or a silver halide camera using the silver halide film. However, it is not limited to this.

(12) A camera which is characterized in that: a camera has a columnar camera main body portion having a photographing lens; a flexible display in which one end is attached to the camera main body portion, and which is provided so that it can be taken-up into the camera main body portion; and a flexible solar battery provided on a surface opposite to a display surface of the display.

Because the display has the flexibility and it can be taken-up into the camera main body portion, the camera becomes compact and is convenient for the carrying-out.

Further, as a flexible solar battery is provided on a surface opposite to the display surface of the display, the light receiving surface of the solar battery can be broadly secured, and the capacity of the solar battery becomes high.

Further, the electricity generated by the solar battery is stored in the battery and by the electric power of the battery, the back light of the display which is lighted in the dark environment may also be driven.

Hereupon, as the flexible display in the present invention, there is the display which is thin and light like a paper, and in which the display image is maintained even when the power source is turned off, so-called the electronic paper (e-paper).

Further, as the electronic paper system, there is a system using the cholesteric liquid crystal, a system in which a multi-color micro-capsule is rotated, a system in which liquid crystal layers of red, green and blue are superimposed, a system using the attraction and separation of the toner between two layers, or a system in which the organic EL is light-emitted on the film. However, it is not limited to this.

Further, as the camera, there is a digital camera using the image pick-up element such as a CCD, or a silver halide camera using the silver halide film. However, it is not limited to this.

(13) A camera which is characterized in that a camera has a columnar camera main body portion having a photographing lens; a flexible display in which one end is attached to the camera main body portion, and which is provided so that it can be taken-up into the camera main body portion; and on the same side as the display surface of the display, there is a solar battery is provided.

Because the display has the flexibility and it can be taken-up into the camera main body portion, the camera becomes compact and is handy to carry.

As a solar battery is provided on the same surface as the display surface of the display, the sunlight is incident on the light receiving surface of the solar battery under the front-lighted condition in which the photographing is normally frequently conducted, the efficiency of the solar battery becomes good.

Further, the electricity generated by the solar battery is stored in the battery and by the electric power of the battery, the back light of the display which is lighted in the dark environment may also be driven.

(14) A camera which is characterized in that: a camera has a columnar camera main body portion having a photographing lens; a flexible display in which one end is attached to the camera main body portion, and which is provided so that it can be taken-up into the camera main body portion; and on the upper side of the display, to the front surface or the rear surface of the display, there is provided a bendable flexible solar battery.

Because the display has the flexibility and it can be taken-up into the camera main body portion, the camera becomes compact and is handy carry.

As a flexible solar battery is provided on the upper side of the display, which is bendable to the front surface and the rear surface of the display, the camera is structured so that, normally, the display is bent on the surface of reverse direction to the display surface of the display and the sunlight radiates on the solar battery.

In the case where the display surface of the display cannot be visually confirmed because it is glared by the outdoor daylight, when the solar battery is bent to the display surface side of the display and is made a hood, the visual confirmation property of the display is increased.

Further, the electricity generated by the solar battery is stored in the battery and by the electric power of the battery, the back light of the display which is lighted in the dark environment may also be driven

(15) A camera described in any one of Structure (12)–(14) which is characterized in that the back-light of the display is driven by the solar battery.

When the back-light of the display whose power consumption is much, is driven by the solar battery, the drive time period of the camera becomes long. Further, the electricity generated by the solar battery is stored in the battery, and by the electric power of the battery, the back light of the display which is lighted in the dark environment may also be driven.

(16) A camera which is characterized in that: a camera has a columnar camera main body portion having a photographing lens; a flexible display in which one end is attached to the camera main body portion, and which is provided so that it can be taken-up into the camera main body portion; and a lighting section for the display is provided on the surface opposite to the display surface of the display.

Because the display has the flexibility and can be taken-up into the camera main body portion, the camera becomes compact and is handy to carry. As the lighting section for the display is provided on the surface of the contrary side to the display surface of the display, the visual confirmation property is increased.

(17) A camera which is characterized in that: a camera has a columnar camera main body portion having a photographing lens; a flexible display in which one end is attached to the camera main body portion, and which is provided so that it can be taken-up into the camera main body portion; and there is provided a display support mechanism to support the display under the condition that the display is stretched to the camera main body portion.

Because the display has the flexibility and can be taken-up into the camera main body portion, the camera becomes compact and is handy to carry. In the case where the display is a type by which the display image is maintained even when the power supply is turned off, when the display is supported by using the display support mechanism under the condition that the display is spread, the camera becomes the photograph stand.

(18) A camera which is characterized in that: a camera has a columnar camera main body portion having a photographing lens; a flexible display in which one end is attached to the camera main body portion, and which is provided so that it can be taken-up into the camera main body portion; and the display is provided in such a manner that it is taken-up into the outer peripheral surface of the camera main body portion so as to cover the photographing lens.

Because the display has the flexibility and can be taken-up into the camera main body portion, the camera becomes compact and is handy to carry. When the display is taken-up into the outer peripheral surface of the camera main body portion so as to cover the photographing lens by the display, the protection of the photographing lens at the time of no-use of the camera can be achieved.

(19) A camera described in Structure (18) which is characterized in that: it has a display take-up detection means for detecting that the display is taken-up into the camera main body portion; and a control section for receiving the signal from the display take-up detection means and for turning on and off of the power source.

Because the display has the flexibility and can be taken-up into the camera main body portion, the camera becomes compact and is handy to carry. When the camera has the display take-up detection means for detecting that the display is taken-up into the camera main body portion, and a control section for receiving the signal from the display take-up detection means and for turning on and off of the power source, because the photographing can be conducted immediate after the display taken-up into the camera main body portion is fed-out, the operability is good.

Further, when the display is taken-up into the camera main body portion, because the power source is turned off, the operability is good, and further, there is no case where the turning-off of the power source is forgotten, and it is power saving.

(20) A camera which is characterized in that: a camera has a columnar camera main body portion having a photographing lens; a flexible display in which one end is attached to the camera main body portion, and which is provided so that it can be taken-up into the camera main body portion; the photographing lens is provided so that it can move between the first position at which the axial direction of the camera main body portion can be photographed and the second position at which the display surface direction of the fed-out display can be photographed; the display take-up and feed-out means for taking-up and feeding-out the display; a display take-up and feed-out amount detection means for detecting the take-up and feed-out amount of the display; a photographing lens moving means for moving the photographing lens to the first position and second position; a photographing lens position detection means for detecting the position of the photographing lens; and a control section by which a signal from the display take-up and feed-out amount detection means is taken in, and when the display is fed-out, the photographing lens moving means is driven, and the photographing lens is moved to the second position, and under the condition that the display is taken-up, the signal from the photographing lens position detection means is taken in, and when the photographing lens is moved to the second position, the display take-up and feed-out means is driven, and the display is fed-out.

Because the display has the flexibility and can be taken-up into the camera main body portion, the camera becomes compact and is handy to carry. Because the photographing lens is provided so that it can move between the first position at which the axial direction of the camera main body portion can be photographed and the second position at which the display surface direction of the fed-out display can be photographed, even when the zoom lens which is long in the optical axis direction is used, it becomes a compact camera.

When the control section takes in a signal from the display take-up and feed-out amount detection means, and when the display is feed-out; drives the photographing lens moving means, and moves the photographing lens to the second position, and under the condition that the display is taken-up, the signal from the photographing lens position detection means is taken in, and when the photographing lens is moved to the second position, the display take-up and feed-out means is driven, and the display is fed-out, that is, when the display is fed-out, the photographing lens is moved to the second position, and when the photographing lens is moved to the second position, the display is fed-out, thereby, the operability becomes good.

(21) A camera which is characterized in that: a camera has a columnar camera main body portion having a photographing lens; a flexible display in which one end is attached to the camera main body portion, and which is provided so that it can be taken-up into the camera main body portion; and an image recording medium for recording plural items of image data; a display feed-out detection means for detecting that the display taken-up into the camera main body portion is fed-out; and a control section for receiving a signal from the display feed-out detection means, and when the display is fed-out, for displaying the image data which is different from that of the last time, from the image recording means onto the display.

Because the display has the flexibility and can be taken-up into the camera main body, the camera becomes compact and is handy to carry. Because the different image is displayed every time when the display taken-up into the camera main body portion is fed-out, when it is used as the photograph stand, the changing-over of the photographs can be conducted by the easily understandable operation. Further, when this camera is used as a photographic album, because the photographs are changed-over by the operation similar to the turning of the page of the album, it becomes a user-friendly photographic album.

(22) A camera which is characterized in that: a camera has a camera main body portion having a photographing lens; and a flexible display in which one end is attached to the camera main body portion, and which is provided so that it can be taken-up into the camera main body portion, and the flexible display is a transmission type display.

Because the display has the flexibility and can be taken-up into the camera main body portion, the camera becomes compact and is handy to carry. Because the flexible display is a transmission type display, the image to be photographed can be confirmed not only by the photographer, but also by the object.

(23) A camera which is characterized in that: a camera has a columnar camera main body portion having a photographing lens; and a flexible display in which one end is attached to the camera main body portion, and which is provided so that it can be taken-up into the camera main body portion, and the display has two display sections along its feed-out direction, and when the display is fed-out, a leading edge side display section can be bent so that it can be confirmed visually from the object side.

Because the display has the flexibility and can be taken-up into the camera main body portion, it becomes compact and is handy to carry. When the display has two display sections along its feed-out direction, and when the display is fed-out, by bending one hand display section so that it can be confirmed from the object side, the image to be photographed can be confirmed not only by the photographer, but also by the object.

A camera which is characterized in that: the camera has the first camera main body portion having the first photographing lens, and the second camera main body portion having the second photographing lens; a flexible display whose one end is attached to the first camera main body portion, and whose other end is attached to the second camera main body portion, and the first display section and the second display section are continuously formed from the first camera main body portion toward the second camera main body portion, and which can be taken-up into at least any camera main body portion of the first camera main body portion and the second camera main body portion; and the image photographed by the first photographing lens is displayed on the first display section, and the image photographed by the second photographing lens is displayed on the second display section.

Because the display is structured in such a manner that one end is attached to the first camera main body portion, and the other end is attached to the second camera main body portion, and the display can be taken-up into at least any camera main body portion of the first camera main body portion and the second camera main body portion, the camera becomes compact and is handy to carry.

Because the camera has the first photographing lens and the second photographing lens, a panorama image whose angle of view is wide, and which is obtained when, normally, the image is photographed by dividing at two times and composed, can be photographed at one time, and further, also the splicing of the image area becomes easy.

(25) A camera which is characterized in that: a camera has a camera main body portion having a photographing lens; a flexible display in which one end is attached to the camera main body portion, and which is provided so that it can be taken-up into the camera main body portion; and a grip portion which is attached to the other end of the display, and the first photographing lens is provided on the one end of the camera main body portion, and the second photographing lens is provided on the other end, and the first release is provided on one end of the grip portion, and the second release is provided on the other end.

Because the display has the flexibility and can be taken-up into the camera main body portion, it becomes compact and is handy to carry. When the first photographing lens is provided on the one end of the camera main body portion, and the second photographing lens is provided on the other end, and the first release is provided on one end of the grip portion, and the second release is provided on the other end, because a right handed photographer photographs by using the first photographing lens and the first release, and a left handed photographer can photograph by using the second photographing lens and the second release, the operability is good.

(26) A camera which is characterized in that: a camera has a columnar camera main body portion having a photographing lens; a flexible display in which one end is attached to the camera main body portion, and which is provided so that it can be taken-up into the camera main body portion; and a grip portion which is attached to the other end of the display, and a photographing lens rotatable in the peripheral direction is provided in the intermediate portion of the camera main body portion, and the image is displayed on both surfaces of the display.

Because the display has the flexibility and can be taken-up into the camera main body portion, it becomes compact and is handy to carry. When a photographing lens rotatable in the peripheral direction is provided in the intermediate portion of the camera main body portion, and the image is displayed on both surfaces of the display, by rotating the photographing lens by 180°, also for the right handed photographer or for the left handed photographer, the operability become good.

(27) A camera which is characterized in that: there are provided a columnar camera main body portion having a photographing lens; a flexible display in which one end is attached to the camera main body portion through a hinge means, and which is provided so that it can be taken-up into the camera main body portion, and on whose front surface, the first display section, and on whose rear surface, the second display section are formed; a grip portion which is provided at the other end of the display and at which the release is provided; a swinging leaf detection means for detecting the direction to which the swinging leaf is fallen, on the display side of the hinge means; and a control section by which a signal from the swinging leaf detection means is taken in, and which judges in which direction the display is with respect to the camera main body portion, and by which the display on the photographer side is driven.

Because the display has the flexibility and can be taken-up into the camera main body portion, the camera becomes compact and is handy to carry.

The direction of the display to the camera main body portion when the right handed photographer photographs and the direction of the display to the camera main body portion when the left handed photographer photographs are reverse to each other, and the control section takes-in a signal from the swinging leaf detection means, and it judges in which direction to the camera main body portion, the display is, and drives only the display section on the photographer side, thereby, the camera becomes an energy saving camera.

Further, also the display section on the object side may be driven. In this case, the image in which the object is to be photographed, can be confirmed. Further, a photographer-oneself photographing mode is provided, and when the photographer-oneself photographing mode is selected, it may also be conducted so that the control section takes-in a signal from the swinging leaf detection means, and judges in which direction to the camera main body portion, the display is, and drives only the display section on the photographer side.

(28) A camera described in Structure (27) which is characterized in that: the display is a translucent display. When a translucent display is used, it is not necessary that independent display sections are provided on both surfaces of the display, thereby, the cost reduction can be achieved.

Hereupon, when the translucent display is driven, it is preferable that, for the image on the object side, the image on the photographer side is reversed.

(29) A camera described in Structure (27) which is characterized in that: the display section is formed on both surfaces of the display.

When the display section is formed on both surfaces of the display, a means for reversing the image is not necessary.

DETAILED DESCRIPTION OF THE PREFERRED EMBODIMENT

Embodiment 1

Figure 1:
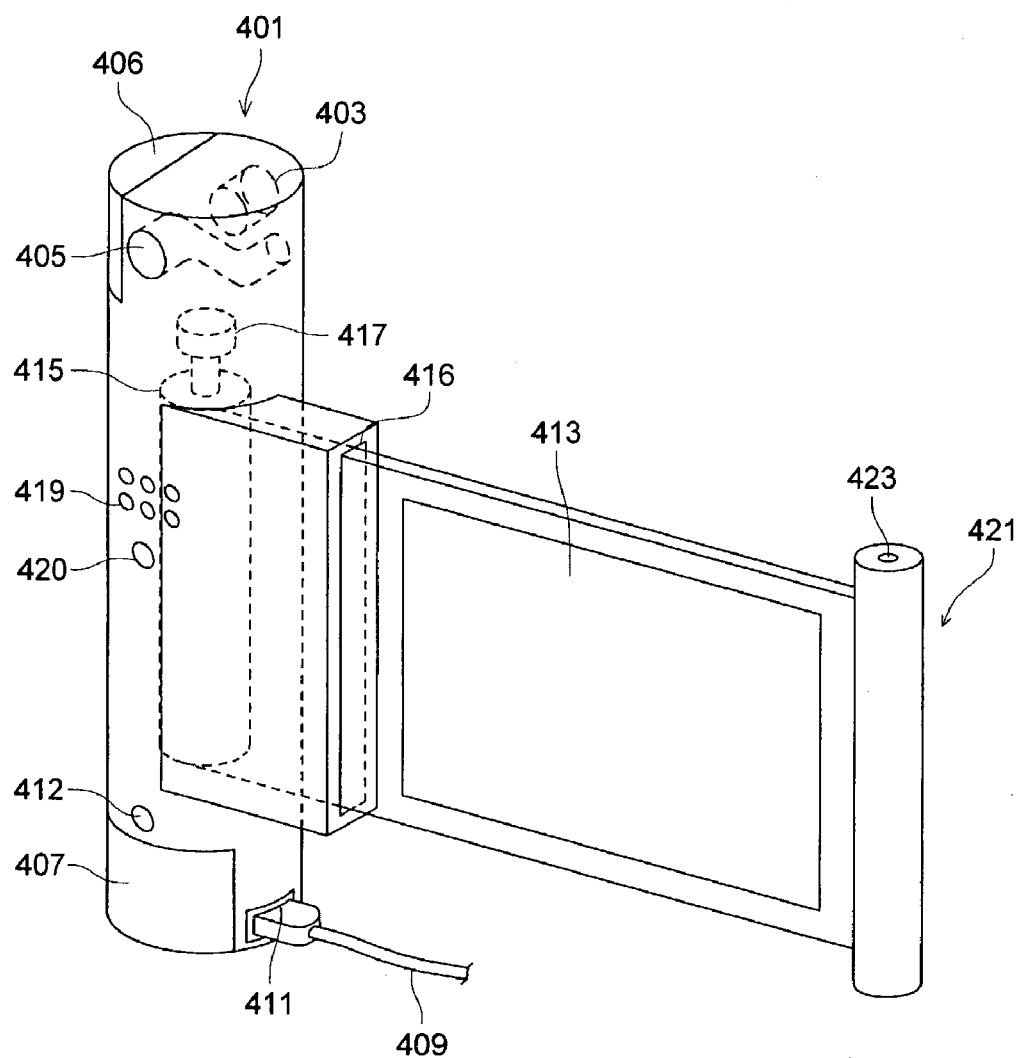
FIG. 1 is a view for explaining the appearance shape of a camera of the embodiment 1.

Initially, referring to FIG. 1, the appearance shape of a camera of Embodiment 1 will be described. In the view, on the upper portion of a columnar camera main body portion 401, a photographing lens 403 and an optical viewfinder 405 are provided. Hereupon, in the optical viewfinder of the present embodiment, a viewfinder light shielding means (not shown) for shielding the light in the optical path of the optical viewfinder is provided. Hereupon, in the present embodiment, the viewfinder light shielding means is structured such that it shields the light in the optical path of the optical viewfinder. However, even when it is structured such that the light is shielded at either portion of an objective portion or an ocular portion of the optical view finder, it may be allowable.

Further, there is provided on the upper portion of the camera main body 401, a memory card cover 406 for putting-in and putting-out of the memory card in which the photographed image is recorded. There are provided in the lower portion of the camera main body portion 401, a battery cover 407, a charge terminal 411 to which the charging cable 409 is connected, and an external input terminal 412 by which a photographic trigger signal from the outside of the camera is taken in.

There is provided inside of the intermediate portion of the camera main body portion 401, one hand end portion of the display 413 which is an electronic paper is engaged, and a reel 415 into which the display 413 is taken. Further, the display 413 can be fed-out toward the outside of the camera main body portion 401 through a slit 416 formed in the intermediate portion of the camera main body portion 401. Then, the reel 415 is structured such that the display 413 is rotated in the take-up direction or feed-out direction by a motor (display feed-out and take-up drive means) 417.

Further, there are provided inside of the intermediate portion of the camera main body portion 401, a photographing mode determination means 419 for selecting the photographing mode (normal photographing, interval photographing for photographing every predetermined time, reservation photographing for photographing at a predetermined time, interval reproduction for reproducing every predetermined time), and a power source switch 420.

A columnar grip portion 421 is attached to the other hand end portion of the display 413. There is provided a release 423 on this grip portion 421. Hereupon, the release 423 may also be provided in the camera main body portion 401.

Figure 2:
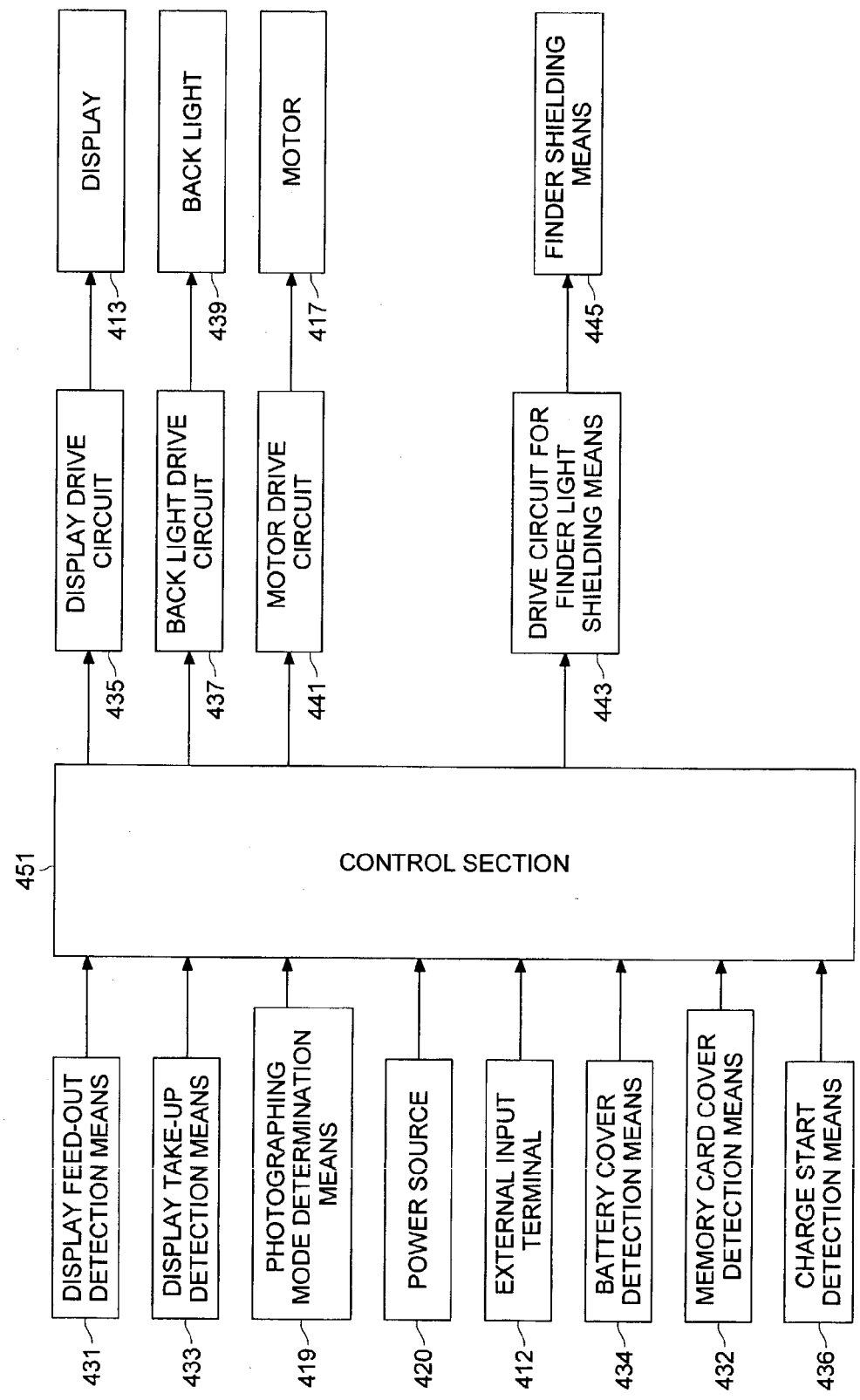
FIG. 2 is a view for explaining the electric structure of the camera shown FIG. 1.

Next, referring to FIG. 2, the electric structure of the camera structured as described above will be explained. In the view, numeral 431 is a display feed-out detection means as the first detection means for detecting that the display 413 is fed-out from the camera main body portion 401, and numeral 433 is a display take-up detection means as the second detection means for detecting that the display 413 is perfectly taken-up into the camera main body portion 401. Hereupon, in Embodiment 1, for the display feed-out means 431 and the display take-up means 433, an encoder by which the absolute position of the display 413 is detected, is used. However, this is not limited to the encoder. Other than this encoder, a photo-interrupter, proximity switch, or micro-switch may also be used. Numeral 434 is a battery cover detection means for detecting that the battery cover 407 is opened, numeral 432 is a memory card cover detection means for detecting that the memory card cover 406 is opened, and numeral 436 is a charge start detection means for detecting that the charge cable 409 is connected to the charge terminal 411 and the charge is started.

Numeral 435 is a display drive circuit for displaying the image on the display 413, numeral 437 is a back light drive circuit for driving the back light 439 of the display 413, numeral 441 is a motor drive circuit for driving the motor 417, and numeral 443 is a viewfinder light shielding means drive circuit for driving the viewfinder light shielding means 445.

Numeral 451 is a control section to drive a display drive circuit 435, back light drive circuit 437, motor drive circuit 441, and viewfinder light shielding means drive circuit 443, after a signal from a display feed-out detection means 431, display take-up detection means 433, photographing mode determination means 419, power source switch 420, external input terminal 412, battery cover detection means 434, and charge start detection means 436, is received.

Next, the operation of the above-described structure will be described.

(Normal Photographing)

When the power source switch 420 is turned on, and a normal photographing mode is selected by a photographing mode determination means 419, the control section 451 drives the motor 417 through the motor drive circuit 441, and the flexible display 413 is fed-out from the camera main body portion 401.

Then, one hand holds the camera main body portion 401 so that the display 413 is in the spread condition, and the other hand holds the grip portion 421, and the framing is conducted by the display 413, and the photographing is conducted by pressing a release 423 provided on the grip portion 421.

In this case, when the display 413 is fed-out from the camera main body portion 401, the display feed-out detection means (first detection means) 431 and the display take-up detection means (second detection means) 433 responds to that, and the control section 451 takes in a signal of the display feed-out detection means 431 and drives the display 413 through the display drive circuit 435, and lightens the back light 439 through the back light drive circuit 437, and the image obtained by the photographic 403 is displayed. Further, the control section 451 drives the viewfinder light shield means 445 through the viewfinder light shield means drive circuit 443, and the framing through the optical viewfinder 405 cannot be conducted.

When the photographing is completed and the power source switch 420 is turned off, the control section drives the motor 417 through the motor drive circuit 441, and takes-up the flexible display 413 into the camera main body portion 401. In this case, when the display is perfectly taken-up, the display take-up detection means 433 correspondingly responds, and the control section 451 stops the drive of the display 413 through the display drive circuit 435, and turns off the back light 439 through the back light drive circuit 437.

In the camera of Embodiment 1, in the case where the release 423 is not pressed, when a predetermined time period passes after the display 413 is fed-out from the camera main body portion 1, or a predetermined time period passes after the release 423 is pressed, the control section 451 becomes the power saving mode. Then, the control section 451 drives the motor 417 through the motor drive circuit 441, and the display 413 is taken-up into the camera main body portion 401.

Further, in the case where the battery is replaced, when the battery cover 407 is opened, the battery cover detection means 434 responds to that, and the control section 451 drives the motor 417 through the motor drive circuit 441, and takes-up the display 413 into the camera main body portion 401.

In the same manner, in the case where the memory card is replaced, when the memory card cover 406 is opened, the memory card cover detection means 432 responds to that, the control section 451 drives the motor through the motor drive circuit 441, and takes-up the display 413 into the camera main body portion 401.

Further, when the charge cable 409 is connected to the charge terminal 411, the charge start detection means 436 responds to that, the control section 451 drives the motor 417 though the motor drive circuit 441, and takes-up the display 413 into the camera main body portion 401.

Hereupon, in the case where the power saving mode is not provided, when the release 423 is not pressed, when a predetermined time period passes after the display is fed-out from the camera main body portion 401, or a predetermined time period passes after the release 423 is pressed, the control section 451 dives the motor 417 through the motor drive circuit 441, and the display 413 may also be taken-up into the camera main body portion 401.

Further, when the display 413 is taken-up, there is a case where it is not perfectly taken-up into the camera main body portion 401 by any cause, and the control section 451 takes in a signal from the display take-up detection means (the second detection means), and when the display 413 is not perfectly taken-up for a predetermined time period from the start of the take-up, the take-up is stopped and the control section 451 is made a power saving mode.

(Other than Normal Photographing Mode)

In the cases where the interval photographing is selected by the photographing mode determination means 419, the reservation photographing is selected, at every time of the photographing or reproducing, the control section 451 feeds-out the display 413 from the camera main body portion 401, and displays the image to be photographed or reproduced.

Further, even when the photographing trigger signal is inputted from the external input terminal 412, the control section 451 feeds-out the display 413 from the camera main body portion 401 every time of the photographing. According to the above-described structure, the following effects can be obtained.

(1) In the case where the camera is not used, when the display 413 is taken-up into the camera main body portion 401, the camera becomes a small sized one.

(2) The control section 451 takes in a signal of the display feed-out detection means (the first detection means) 431 and the display take-up detection means (the second detection means) 433, and when the display is fed-out from the condition that the display 413 is perfectly taken-up into the camera main body portion 401, the control section 451 drives the display 413 and back light 439. Further, in the case where the display 413 is perfectly taken-up into the camera main body portion, when the control section 451 stops the drive of the display 413 and back light 439, the camera results in the power saving.

(3) Even under the condition that the display 413 is taken-up into the camera main body portion 401, the photographing can be conducted by using the optical viewfinder 405. That is, even at the time of the quick photographing, the photographing can be conducted by using the optical viewfinder 405.

(4) In the case where the display 413 is fed-out, when the control section 451 drives the viewfinder light shielding means 445, the framing operation becomes clear.

(5) When the release 423 is provided on the grip portion 421, the operability becomes good.

(6) In the condition that the display 413 is fed-out, because the back light of the display 413 and the display drive circuit 435 are operated, the power consumption is large. In the present embodiment, at the time of the change of the condition, that is, when the condition becomes a power saving mode, the battery cover 407 is opened, and the charge is conducted, because the control section 451 takes-up the display 413 in the camera main body portion 401, and stops the back light 439 of the display 413 and the display drive circuit 435, the camera becomes the power saving.

(7) In the case where the interval photographing is conducted, when the reservation photographing is conducted, the interval reproduction is conducted, or the photographing trigger signal is inputted from the external input terminal 412, by feeding-out the display 413 from the camera main body portion 401 by the control section 451, by the large change of the appearance shape, it is easily understood that the camera becomes the photographing condition.

Further, also the image to be photographed or to be reproduced, can be confirmed through the display 413. Furthermore, when the display 413 is housed at the time other than the photographing or reproducing, the display 413 can be protected from the flaws and dusts.

(8) When the control section 451 stops the take-up when the display 413 is not perfectly taken-up for a predetermined time period from the start of the take-up, and makes the camera a power saving mode, the damage of the display 413 can be prevented.

Hereupon, the present invention is not limited to Embodiment 1. In Embodiment 1, the explanation is made in the structure in which the display 413 is taken-up into the inside of the camera main body portion 401, however, it may be the structure in which the display 413 is taken-up around the outer cylindrical surface of the camera main body portion 401. In this case, it is preferable that the ocular portion of the optical viewfinder 405, objective portion, and photographing lens 403 are provided at other portions than a portion at which the display is taken-up.

Furthermore, in the above-described Embodiment 1, although the motor is used as the drive source of the take-up/feed-out of the display 413, the manual operation may also be used for the feed-out, and the elastic resiliency of the spring may also be used for the take-up.

As described above, according to the invention described in Structure (1), when the camera is not used, the display is taken-up in the camera main body portion, thereby, the camera becomes a small size.

According to the invention described in Structure (2), the first detection means for detecting that the display taken-up into the camera main body portion, is fed-out, and the second detection means for detecting that the display is perfectly taken-up in the camera main body portion, are provided, and the camera has a control means by which a signal of the first detection means and the second detection means is taken in, and the display is driven, thereby, the control section takes in a signal of the first detection means and the second detection means, and when the display is fed-out from the condition that the display is perfectly taken-up in the camera main body portion, the control section drives the display, and when the display is perfectly taken-up in the camera main body portion, the control section stops the dive of the display, thereby, the camera becomes the power saving one.

According to the invention described in Structure (3), the photographing can be conducted by using the optical viewfinder even under the condition that the display is taken-up in the camera main body.

According to the invention described in Structure (4), the viewfinder light shielding means for shielding the light at any position in the optical path of the optical view finder, objective portion or ocular portion is provided, and when the control section takes in a signal of the first detection means and dives the viewfinder light shielding means, the framing operation becomes clear.

According to the invention described in Structure (5), when the release is provided at either one portion of the camera main body portion or the grip portion, the operability is good.

According to the invention described in Structure (6), the condition under which the display is fed-out, because the back light of the display, and display drive circuit are operated, the power consumption is large.

After a means for taking-up the display in the camera main body is provided, and the display is fed-out, by the change of the condition, when the control section drives the taking-up means, the camera becomes a power saving one.

According to the invention described in Structure (7), the change of the condition is any one of the time when a predetermined time period passes after the display is fed-out, camera becomes a power saving mode, a predetermined time period passes after the photographing is conducted, the charge is started, the battery case cover is opened, or the memory card cover is opened, thereby, the camera becomes a power saving mode.

According to the invention described in Structure (9), the control section takes in a signal from the second detection means, and when the display is not perfectly taken-up within a predetermined time period after the start of the taking-up, the taking-up is stopped, and the camera is made a power saving mode, thereby, the damage of the display can be prevented.

According to the invention described in Structure (9), the feed-out means for feeding-out the display from the camera main body portion is provided, and when the control section drives the feed-out means according to the change of the condition after the display is taken-up, it is easily understood by the large change of the appearance shape that the camera is transferred to the photographing condition or reproducing condition.

Further, the image to be photographed or the image to be reproduced can also be confirmed through the display. Furthermore, when the display is housed at the time other than the photographing or reproducing, the display can be protected from flaws and dusts.

According to the invention described in Structure (10), it is easily understood from the large change of the appearance shape that the camera becomes the photographing condition. Further, the image to be photographed or the image to be reproduced can also be confirmed through the display.

Further, at the time other than the photographing or reproducing, when the display is housed, the display can be protected from flaws and dusts. According to the invention described in Structure (11), when the camera is not used, by retracting the display, the camera becomes a small size.

Embodiment 2

Figure 3A:
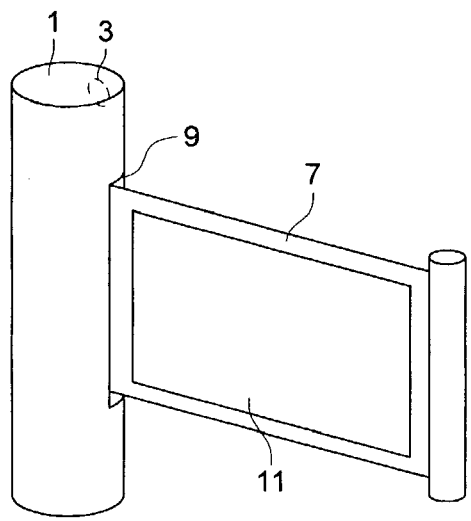
FIGS. 3(*a*) and 3(*b*) are views for explaining Embodiment 2.
Figure 3B:
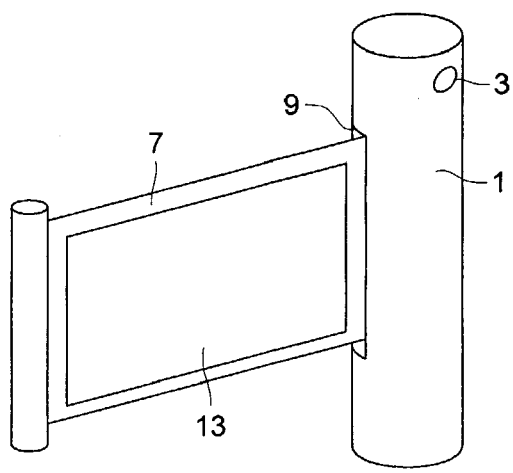

Referring to FIGS. 3(a) and 4(b) showing Embodiment 2, the explain will be made. Hereupon, FIG. 3(a) is a perspective view viewing the camera from the photographer side, and FIG. 3(b) is a view viewing the camera from the object side.

The photographing lens 3 is provided on the camera main body portion 1. Further, one end portion side of the flexible display 7 is attached to the camera main body portion 1, and it can be taken-up in the camera main body portion 1. In the view, the flexible display 7 can be take-up inside the camera main body portion 1 through a slit 9 of the camera main body portion 1.

On one hand surface (the surface of the photographer side) of the display 7, the display portion 11 on which the image is displayed is formed, and on the other hand surface (the object side), the flexible solar battery 13 is provided.

According to the above-described structure, because the display 7 has the flexibility, and can be taken-up in the camera main body 1, the camera becomes compact, and is handy to carry.

Further, when the flexible solar battery 13 is provided on the contrary side to the surface (display surface) on which the display portion 11 of the display 7 is provided, the light receiving surface of the solar battery 13 can be secured broadly, and the capacity of the solar battery becomes high.

Further, it is preferable that the electric power obtained by the solar battery 13 is used for the drive of the back light of the display 7. When the back light of the display 7 whose power consumption is large, is driven by the solar battery 13, the drive time of the camera becomes long.

Further, the electricity generated by the solar battery is stored in the battery, and by the electric power of the battery, the back light of the display which is lighted in the dark environment, may also be driven.

Embodiment 3

Figure 4:
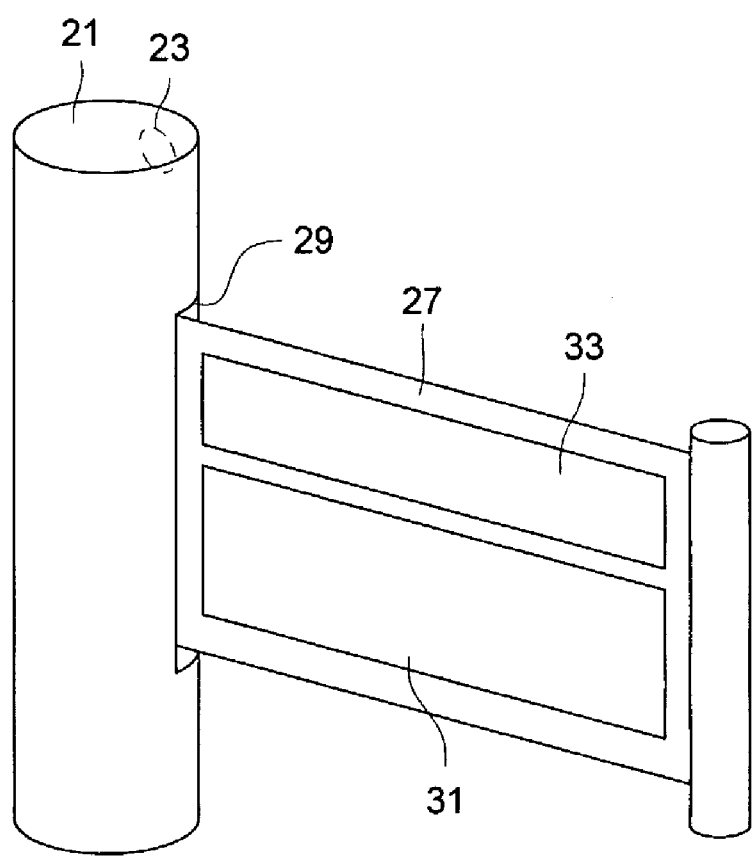
FIG. 4 is a view for explaining Embodiment 3.

Referring to FIG. 4 showing Embodiment 3, the explain will be made. On the camera main body portion 21, the photographing lens 23 is provided.

Further, one end portion side of the flexible display 27 is attached to the camera main body portion 21, and it can be taken-up in the camera main body portion 21. In the view, the flexible display 27 can be taken-up inside camera main body portion 21 through a slit 29 of the camera main body portion 21.

On one hand surface (the surface of the photographer side) of the display 27, the display portion 31 on which the image is displayed, and the flexible solar battery 33 is provided.

According to the above-described structure, because the display 27 has the flexibility, and can be taken-up in the camera main body 21, the camera becomes compact, and is handy to carry.

Further, when the solar battery 33 is provided on the same surface as the surface (display surface) on which the display section 31 of the display 27 is provided, because the sun light is incident on the light receiving surface of the solar battery 33 in the front-lighted condition under which normally the photographing is often conducted, the efficiency of the solar battery becomes good.

Further, it is preferable that the electric power obtained by the solar battery 33 is used for the drive of the back light of the display 27. When the back light of the display 7 whose power consumption is large, is driven by the solar battery 33, the drive time of the camera becomes long.

Further, the electricity generated by the solar battery is stored in the battery, and by the electric power of the battery, the back light of the display which is lighted in the dark environment, may also be driven.

Embodiment 4

Figure 5:
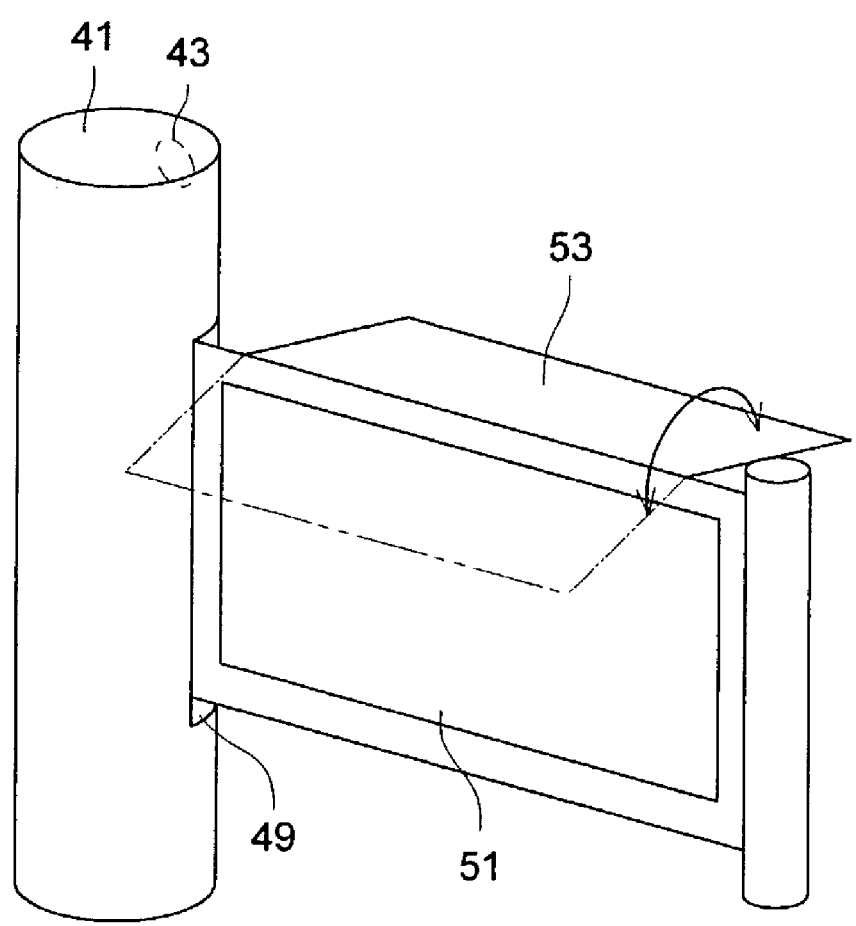
FIG. 5 is a view for explaining Embodiment 4.

Referring to FIG. 5 showing Embodiment 4, the explain will be made. The photographing lens 43 is provided on the camera main body portion 41.

Further, one end portion side of the flexible display 47 is attached to the camera main body portion 41, and it can be taken-up in the camera main body portion 41. In the view, the flexible display 47 can be taken-up inside camera main body portion 41 through a slit 49 of the camera main body portion 41.

There is provided the display section 51 on which the image is displayed, on one hand surface (surface of the photographer side) of the display 47. Further, on the upper side of the display 47, the bendable and flexible solar battery 53 toward the front surface or rear surface of the display 47 is provided.

According to the above-described structure, because the display 47 has the flexibility, and can be taken-up in the camera main body 41, the camera becomes compact and is handy to carry. On the upper side of the display 47, when the bendable and flexible solar battery 53 toward the front surface or rear surface of the display 47 is provided, ordinarily, this system is made so that the battery is bent on the surface of the contrary direction to the surface (display surface) on which the display section 51 of the display 47 exists, and the sun light radiates on the solar battery (in the view, the solid line position).

In the case where the display section 51 of the display 47 cannot be visually confirmed because it is glared by the outdoor daylight, when the solar battery 53 is bent to the surface side (display surface) on which the display section 51 of the display 47 exists, and is made a hood, the visual confirmation property of the display 47 is increased (in the view, two-dotted chain line position).

Further, at the time of photographing, when, in the case of the follow light, the solar battery 53 is positioned at the two-dotted chain line position, and in the case of the rear-light, the solar battery 53 is positioned at the solid line position, the efficiency of the solar battery is increased. Further, it is preferable that the electric power obtained by the solar battery 53 is used for the drive of the back light of the display 47. When the back light of the display 47 whose power consumption is large, is driven by the solar battery 53, the drive time of the camera is prolonged.

Embodiment 5

Figure 6A:
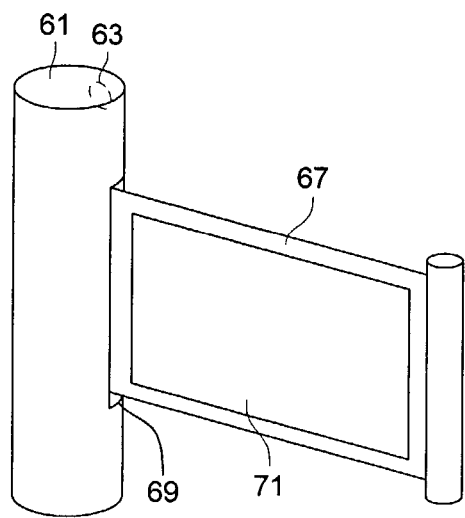
FIGS. 6(*a*) and 6(*b*) are views for explaining Embodiment 5.
Figure 6B:
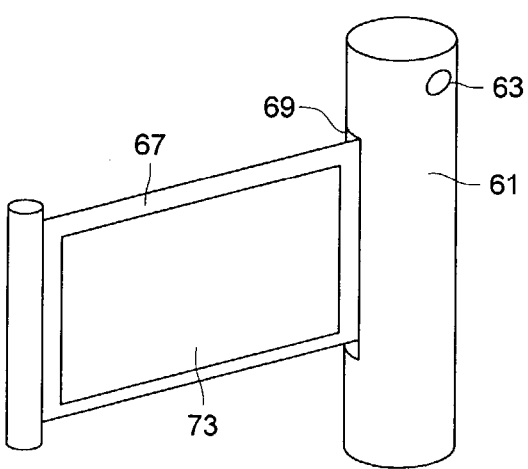

Referring to FIGS. 6(a) and 6(b) showing Embodiment 5, the explanation will be made. Hereupon, FIG. 6(a) is a perspective view viewing the camera from the photographer side, and FIG. 6(b) is a view viewing the camera from the object side.

The photographing lens 3 is provided on the camera main body portion 1. Further, one end portion side of the flexible display 67 is attached to the camera main body portion 61, and it can be taken-up in the camera main body portion 61. In the view, the flexible display 67 can be taken-up into the inside of the camera main body portion 61 through a slit 69 of the camera main body portion 61.

On one hand surface (surface of the photographer side) of the display 67, the display section 71 on which the image is displayed, is formed, and on the other hand surface (object side), a natural lighting portion 73 for the display section 71 of the display 67 is provided.

According to the above-described structure, because the display 67 has the flexibility, and can be taken-up in the camera main body 61, the camera becomes compact and is handy to carry.

When, on the contrary side surface to the surface on which the display section 71 of the display 67 is provided, the natural lighting portion 73 for the display section 71 of the display 67 is provided, the visual confirmation property of the display 67 is increased.

Embodiment 6

Figure 7:
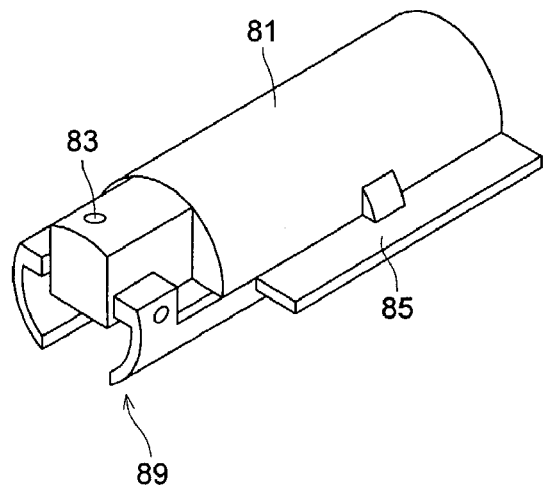
FIGS. 7(*a*) and 7(*b*) are views for explaining Embodiment 6.
Figure 7:
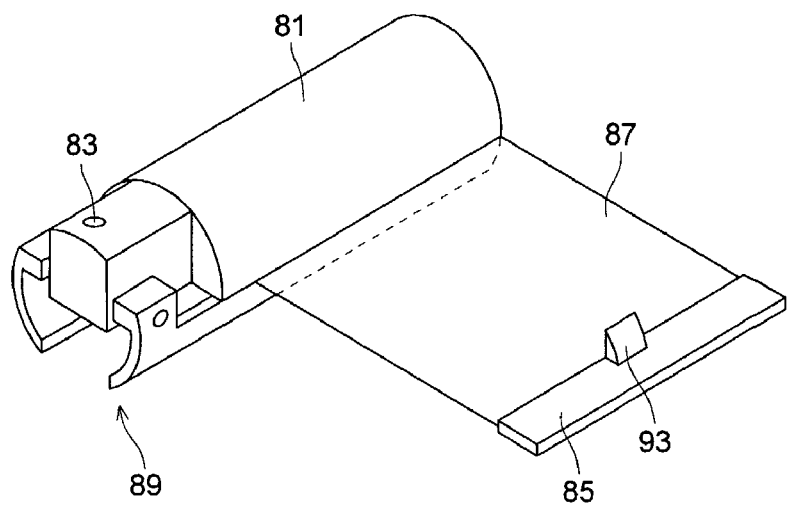
Figure 8:
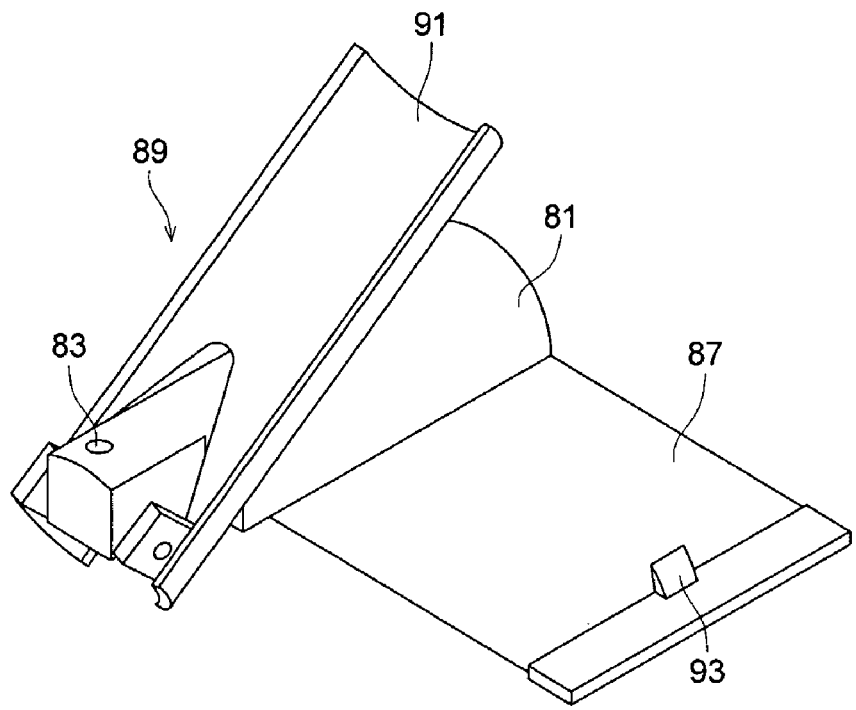
FIGS. 8(*a*) and 8(*b*) are views for explaining Embodiment 6.
Figure 8:
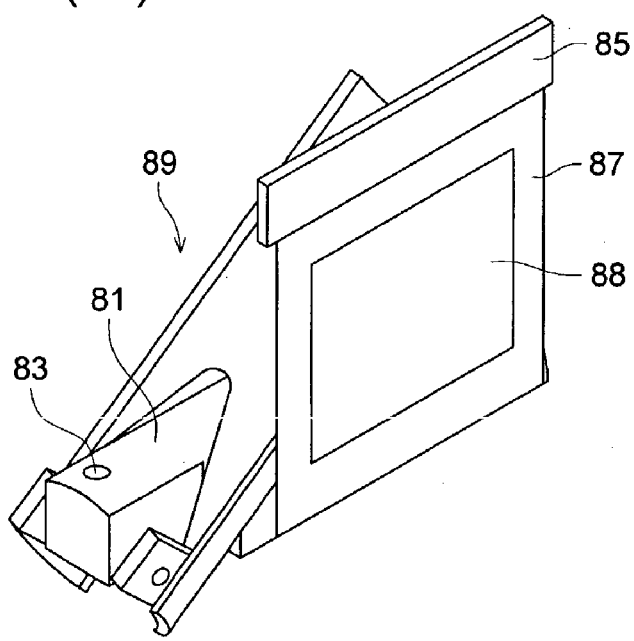

Referring to FIGS. 7(a), 7(b) and FIGS. 8(a) and 8(b) showing Embodiment 6, the explanation will be made. Hereupon, FIGS. 7(a) and 7(b) are perspective views in the case where it is used as the camera, and FIGS. 8(a) and 8(b) are explanation views in the case where the camera of FIGS. 7(a) and 7(b) is used as a photograph stand.

Initially, in FIGS. 7(a) and 7(b), the photographing lens 83 is provided on the camera main body portion 81. Further, as shown in FIG. 7(a), one end portion side of the flexible display 87 is attached to the camera main body portion 81, and as shown in FIG. 7(b), it can be taken-up in the camera main body portion 61. Further on the other end of the display 87, the grip portion 85 is provided. Hereupon, the display 87 of the present embodiment is a type in which the display image is maintained even when the power source is turned off.

Then, on the camera main body portion 81, a display support mechanism 89 for supporting the display 87 in the stretched condition is provided. As shown in FIG. 8(a), this display support mechanism 89 is structured by an almost half-divided cylinder-like support portion 91 whose one end portion is rotatably attached to the camera main body portion 81, and a hook 93 which is provided on the grip portion 85 and can be engaged with the support portion 91.

The support portion 91 is arranged along the rear portion of the camera main body portion 81 as shown in FIGS. 7(a) and 7(b), when this is used as the camera. Further, as shown in FIG. 8(a), the support portion 91 is rotated and moved to the front portion side of the camera main body portion 81.

In this case, the base end portion side of the support portion 91 comes into contact with the camera main body portion 81, and the leading edge portion of the support portion 91 is positioned on almost intermediate portion of the camera main body portion 81. As shown in FIG. 8(b), when the hook formed on the grip portion 85 is engaged with the leading edge portion of the support portion 91, the image is displayed on the display section 88 of the display 87, thereby, it becomes the photograph stand.

Figure 9A:
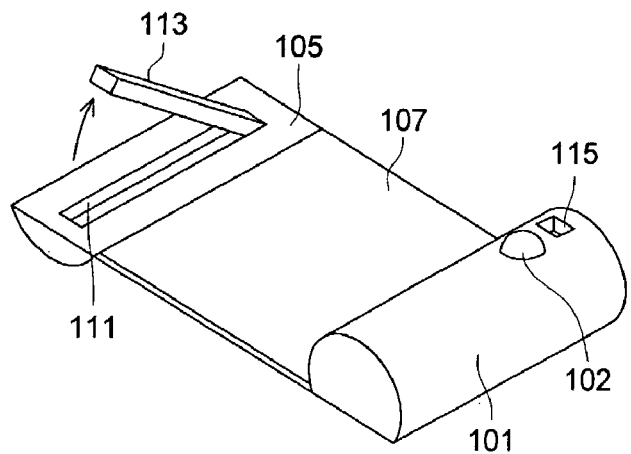
FIGS. 9(*a*)–9(*c*) are views for explaining variations of Embodiment 6.
Figure 9B:
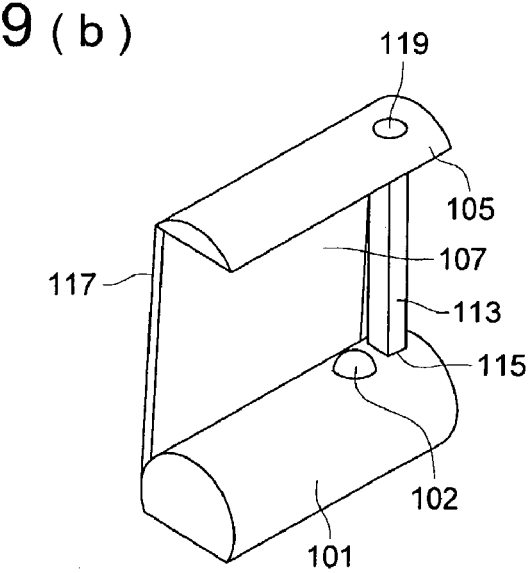
Figure 9C:
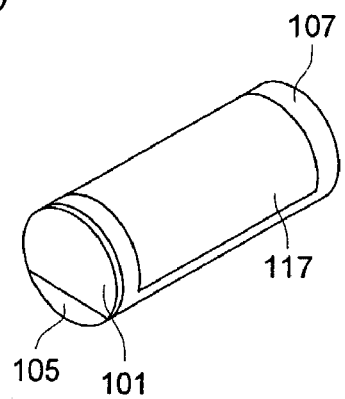

Further, it may also be the structure as shown in FIGS. 9(a) to 9(c). In FIG. 9(a), one end portion side of the flexible display 107 is attached to the camera main body portion 101 provided with a photographing lens 102. On the other end of the display 107, the grip portion 105 is provided. Then, and as shown in FIG. 9(c), the display 107 can be taken-up on the outer peripheral surface of the camera main body portion 101. Hereupon, the display 107 in the present embodiment is a type in which the display image is maintained even when the power source is turned off.

On the camera main body portion 101, a display support mechanism 109 for supporting the display in the condition that it is spread, is provided. This display support mechanism 109 is, as shown in FIG. 9(a), structured by a support bar 113 which is housed in a groove 111 formed on the grip portion 105, and provided so that it can stand-up from the groove, and a hole 115 which is formed on the camera main body portion 101, and with which a leading a edge portion of the support bar 113 can be fitted.

Then, as shown in FIG. 9(b), under the condition that the display 107 is fed-out from the camera main body portion 101, the leading edge portion of the support bar 113 which is in the stand-up condition to the grip portion 105, is engaged with the hole 115 of the camera main body portion 101, and when the image is displayed on the display portion 117 of the display 107, it becomes a photograph stand.

Hereupon, when the release button 119 provided on the grip portion 105 functions as an image switching button at the time of the reproduction, the operability is increased. Further, in FIG. 9(c), when the display 107 is taken-up on the outer peripheral surface of the camera main body portion 101, because the photographing lens 102 is covered by the display 107, the display 107 can also serve to protect the photographing lens 102.

Embodiment 7

Figure 10:
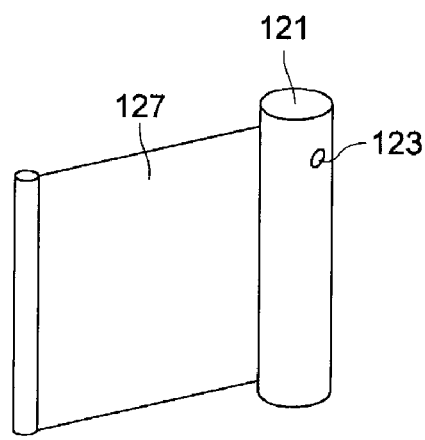
FIGS. 10(*a*) and 10(*b*) are views for explaining Embodiment 7.
Figure 10:
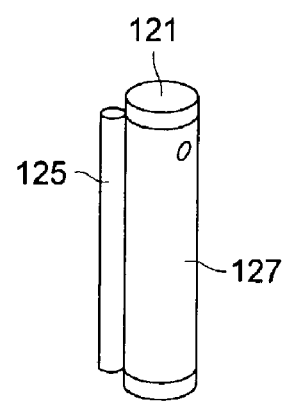
Figure 11:
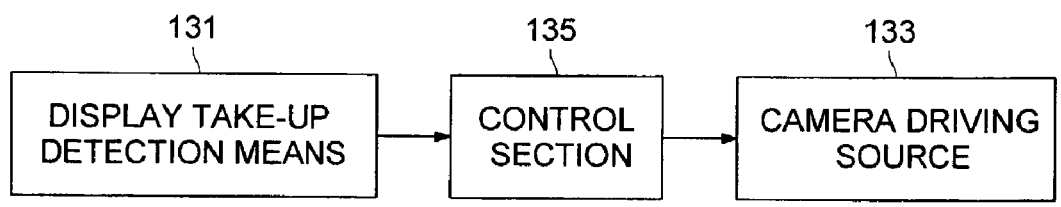
FIG. 11 is a view for explaining the electric structure of the camera shown in FIG. 11.

Referring to FIGS. 10(a), 10(b) and FIG. 11 showing Embodiment 7, the explain will be made. In FIG. 10(a), on the camera main body portion 121, the photographing lens 123 is provided. Further, to the camera main body portion 121, one end portion side of the flexible display 127 is attached. As shown in FIG. 10(b), the display 127 can be taken-up around the camera main body portion 121. Hereupon, in the present embodiment, the display 127 is structured such that it is taken-up on the outer peripheral surface of the camera main body portion 121 so that it covers the photographing lens 123 of the camera main body portion 121. Further, on the other end of the display 127, the grip portion 125 is provided.

Furthermore, in the present embodiment, as shown in FIG. 11, it has a display take-up detection means 131 for detecting that the display 127 is taken-up around the camera main body portion 121, and the control section 135 for receiving the signal from the display take-up detection means 131 and for turning on and off the camera drive power source 133.

As the display take-up detection means 131, there is an encoder for detecting the length of the display 127 fed-out from the camera main body portion 121, micro switch for detecting that the grip portion 125 comes into contact with the camera main body portion 121, or proximity switch, however, it is not limited to this.

The operations of the above-described structure will be described below.

When the display 127 taken-up on the outer peripheral surface of the camera main body portion 121 is fed-out, the display take-up detection means 131 responds to this, and the control section 135 receives a signal from the display take-up detection means 131, and turns on the camera drive power source.

Inversely, when the display 127 is perfectly taken-up on the outer peripheral surface of the camera main body portion 121, the display take-up detection means 131 responds to that, the control section 135 receives a signal from the display take-up detection means 131, and turns off the camera drive power source.

According to the above-described structure, because the display 127 has the flexibility, and can be taken-up around the camera main body 121, the camera becomes compact and is handy to carry. When the outer peripheral surface of the camera main body portion 121 is taken-up so that the display 127 covers the photographing lens 123, the protection of the photographing lens 123 at the time of no-use of the camera can be made.

Further, when the display 127 taken-up around camera main body portion 121 is fed-out, the camera drive power source 133 is turned on and because the photographing can be conducted at soon, the operability is good. Further, when the display 127 is taken-up around the camera main body portion 121, because the camera drive power source 133 is turned off, the operability is good, and further, because there is no case of forgetting the power source off, the camera is power saving.

Embodiment 8

Figure 12:
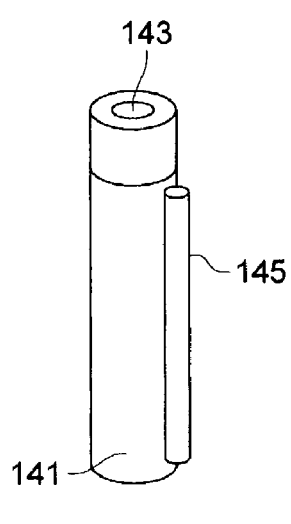
FIGS. 12(*a*) and 12(*b*) are views for explaining Embodiment 8.
Figure 12:
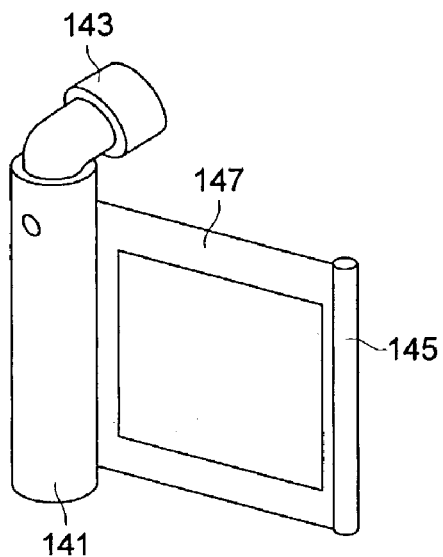

Referring to FIGS. 12(*a*) and 12(*b*) showing Embodiment 8, the explanation will be made. As shown in FIGS. 12(*a*) and 12(*b*), on the columnar camera main body portion 141, the photographing lens 143 is provided. To the columnar camera main body portion 141, one end portion side of a flexible display 127 is attached. In the present embodiment, inside the camera main body portion 141, a reel to take-up the flexible display 147, and a reel drive motor to drive this reel are provided. Accordingly, the display 147 is structured so that it can be taken-up and fed-out to the camera main body portion 141.

Furthermore, on the other end of the display 147, the grip portion 145 is provided. The photographing lens 143 is provided so that it can move between the first position (position shown in FIG. 12(*a*)) at which it can photograph the axial direction of the camera main body portion 141 and the second position (position shown in FIG. 12(*b*))at which it can photograph the display surface direction of the fed-out display 147.

Figure 13:
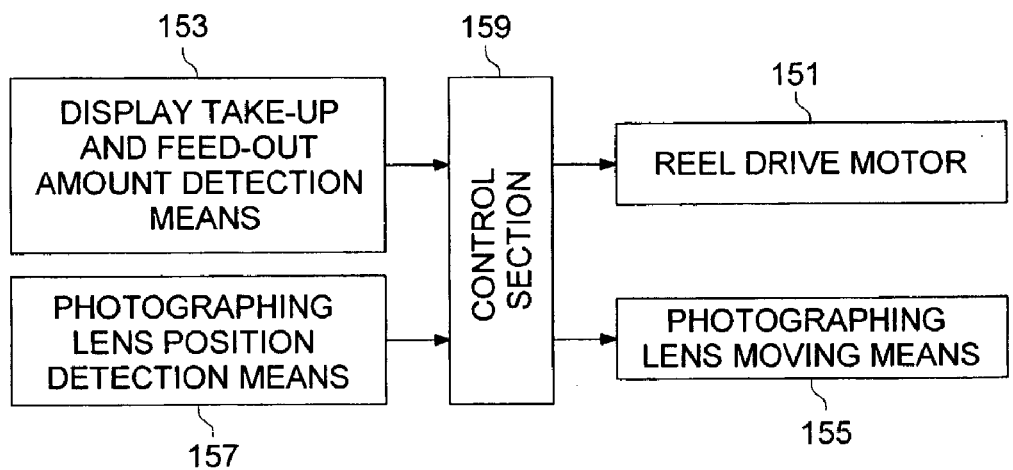
FIG. 13 is a view for explaining the electric structure of the camera shown in FIGS. 12(*a*) and 12(*b*).

Next, referring to FIG. 13, the electric structure of the camera structured as described above will be described. Numeral 151 is a reel drive motor for driving the reel as the display take-up and feed-out means for taking-up and feeding-out the display 147. Numeral 153 is a display take-up and feed-out amount detection means composed of the encoder for detecting the taken-up and fed-out amount of the display 147. Numeral 155 is a photographing lens moving means for moving the photographing lens 143 to the first position and the second position, and numeral 157 is a photographing lens position detection means for detecting the photographing lens position. Numeral 159 is the control section for taking in a signal from the display take-up and feed-out amount detection means 153 and photographing lens position detection means 157, and for driving the reel drive motor 151 and photographing lens moving means 155.

Next, the operations of the above-described structure will be described. When the display 147 is fed-out from the condition shown in FIG. 12(*a*), that is, from the condition that the photographing lens 143 is at the first position, and the display 147 is taken-up around the camera main body portion 141, the display take-up and feed-out amount detection means 153 responds to that, and the control section 159 receives a signal from the display take-up and feed-out amount detection means 153 and dives the photographing lens moving means 155, and moves the photographing lens 143 to the second position, that is, the position shown in FIG. 12(*b*).

Further, from the condition shown in FIG. 12(*a*), that is, from the condition that the photographing lens 143 is at the first position, and the display 147 is taken-up around the camera main body portion 141, when the photographing lens 143 is moved to the second position, that is, the position shown in FIG. 12(*b*), the photographing lens position detection means 157 responds to that, and the control section 159 receives a signal from the photographing lens position detection means 157, and drives the reel drive motor 151, and the display 147 is fed-out from the camera main body portion 141.

According to the above-described structure, because the display 147 has the flexibility, and can be taken-up around the camera main body 141, the camera becomes compact and is handy to carry. Because the photographing lens 143 is structured so that it can move between the first position at which it can photograph the axial direction of the camera main body portion 141 and the second position at which it can photograph the display surface direction of the fed-out display 147, even when a zoom lens which is long in the optical axis direction is used, the camera becomes a compact one.

When the control section 159 receives a signal from the display take-up and feed-out amount detection means 153, and when the display 147 is fed-out, drives the photographing lens moving means 155, and moves the photographing lens 143 to the second position, and under the condition that the display 147 is taken-up, takes in a signal from the photographing lens position detection means 157, and when the photographing lens 143 is moved to the second position, it drives the reel drive motor 151 (display take-up and feed-out means) and feeds-out the display 147, that is, when the display 147 is fed-out, the photographing lens 143 is moved to the second position, and when the photographing lens 143 is moved to the second position, the display 147 is fed-out, thereby, the operability becomes good.

Embodiment 9

Figure 14:
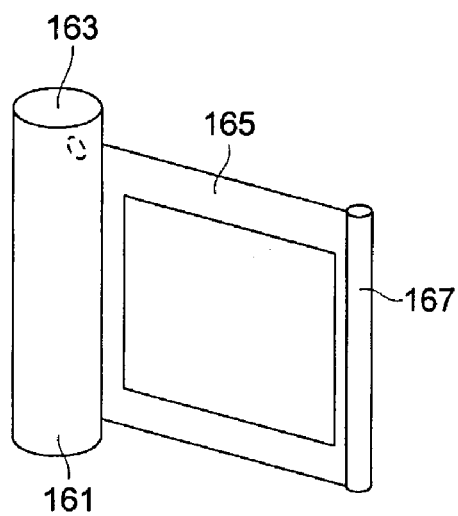
FIG. 14 is a view for explaining Embodiment 9.
Figure 15:
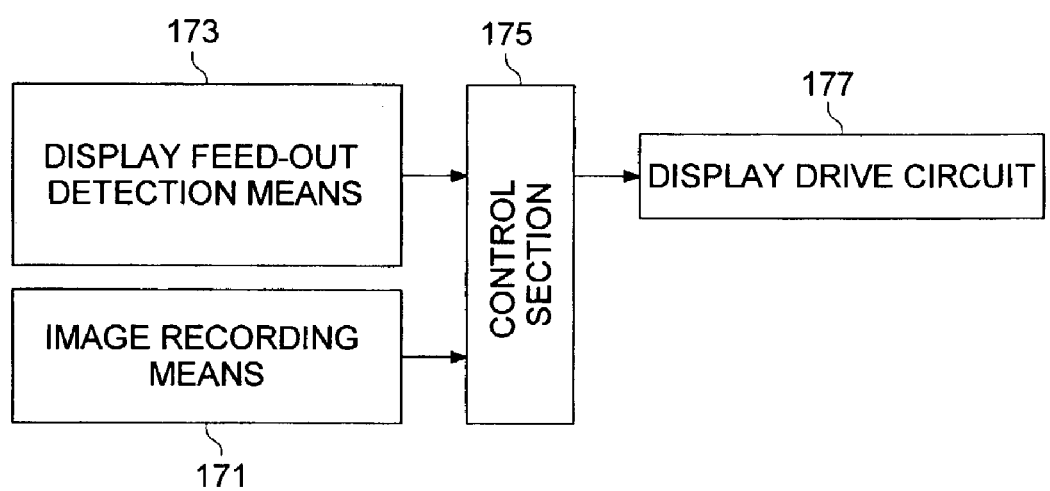
FIG. 15 is a view for explaining the electric structure of the camera shown in FIG. 15.

Referring to FIG. 14 and FIG. 15 showing Embodiment 9, the explanation is made. In FIG. 14, the photographing lens 163 is provided on the camera main body portion 161. To the camera main body portion 161, one end of the flexible display 165 is attached, and this display 165 can be taken-up around the camera main body portion 161.

To the other hand end portion of the display 165, the grip portion 167 is provided. Next, referring to FIG. 15, the electric structure of the camera as described above, will be described. Numeral 171 is an image recording means for recording a plurality of pieces of image data. As this image recording means, there is a memory card detachable to the camera main body portion 161, or RAM or hard disk provided inside the camera main body portion 161, however, it is not limited to that. Numeral 173 is a display feed-out detection means for detecting that the display 165 taken-up around the camera main body portion 161 is fed-out. As the display feed-out detection means 173, there is the encoder for detecting the length of the display 165 fed-out from the camera main body portion 161, micro switch for detecting that the grip portion 167 comes into contact with the camera main body portion 161, or proximity switch, however, it is not limited to that.

Numeral 175 is the control section for taking in a signal from the display feed-out detection means 173, and for controlling the display drive circuit 177 to drive the display 165.

Operations of the above-described structure will be described below. When the display 165 in the taking-up condition around the camera main body portion 161 is fed-out, the display feed-out means 173 responds to that, and the control section 175 takes-in one image data in a plurality of images recorded in the image recording means, and sends it to the display drive circuit 177. The display drive circuit 177 displays the sent image data on the display 165.

Further, when the next image display is conducted, the control section 175 selects the image data different from the last time image data from the image recording means. According to the above-described structure, because the display 165 has the flexibility and can be taken-up around the camera main body 161, the camera becomes compact, and is handy to carry.

Further, every when the display 165 taken-up around the camera main body portion 161 is fed-out, because the different image is displayed, when it is used as the photograph stand, the switching of the photography can be conducted by an understandable operation. Further, when this camera is used as a photography album, because the photography is switched by the operation similar to turn a page of the album, the camera becomes a convenient photography album.

Embodiment 10

Figure 16:
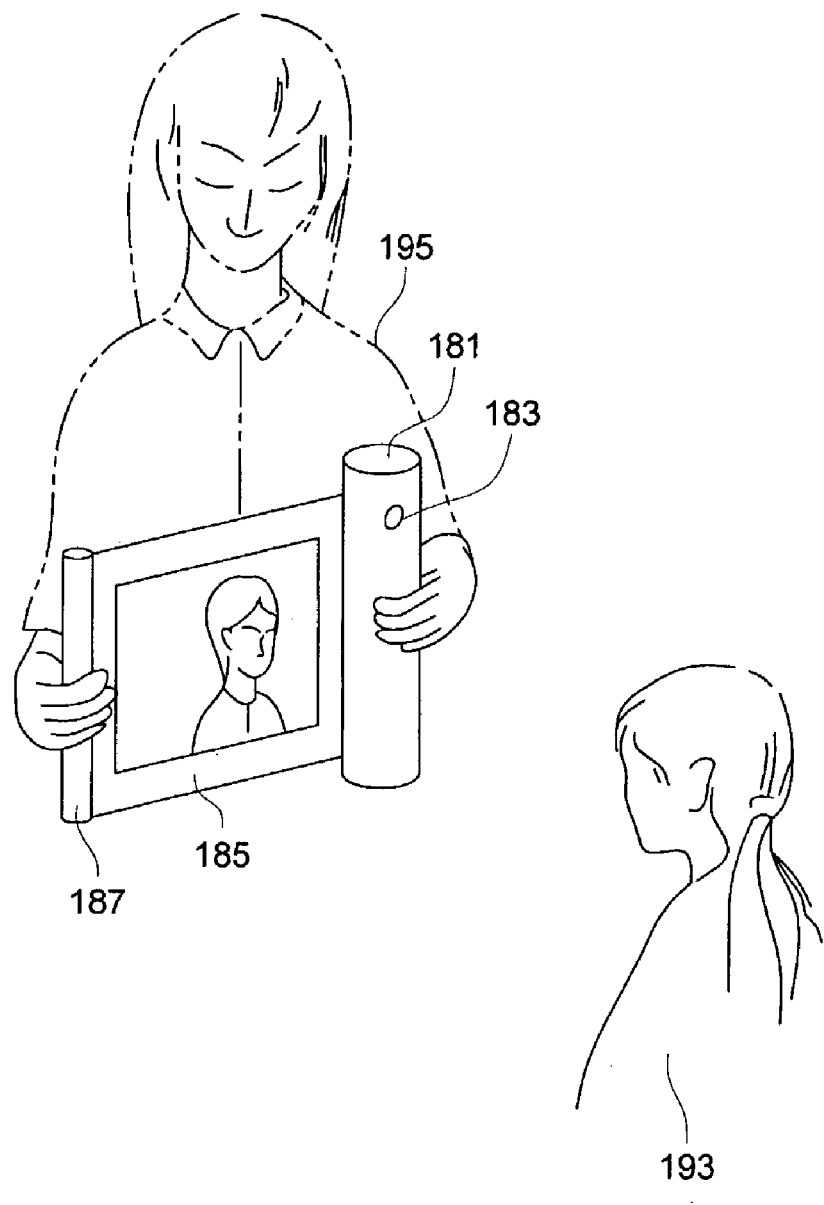
FIG. 16 is a view for explaining Embodiment 10.

Referring to FIG. 16 showing Embodiment 10, the explain will be made. In the view, the photographing lens 183 is provided on the camera main body portion 181. One end of the flexible display 185 is attached to the camera main body portion 181, and this display 185 can be taken-up around the camera main body portion 181.

On the other hand end portion of the display 185, the grip portion 187 is provided. Then, the display 185 in the present embodiment is made a transmission type display on both sides of which the image is displayed. That is, the image displayed on the display 185 can be visually confirmed not only by the photographer 195, but also by the object 193.

According to the above-described structure, because the display 185 has the flexibility, and can be taken around the camera main body portion 181, the camera becomes compact and is handy to carry. Because the flexible display 189 is the transmission type display, the image to be photographed can be confirmed not only by the photographer 195, but also by the object 193.

Embodiment 11

Figure 17:
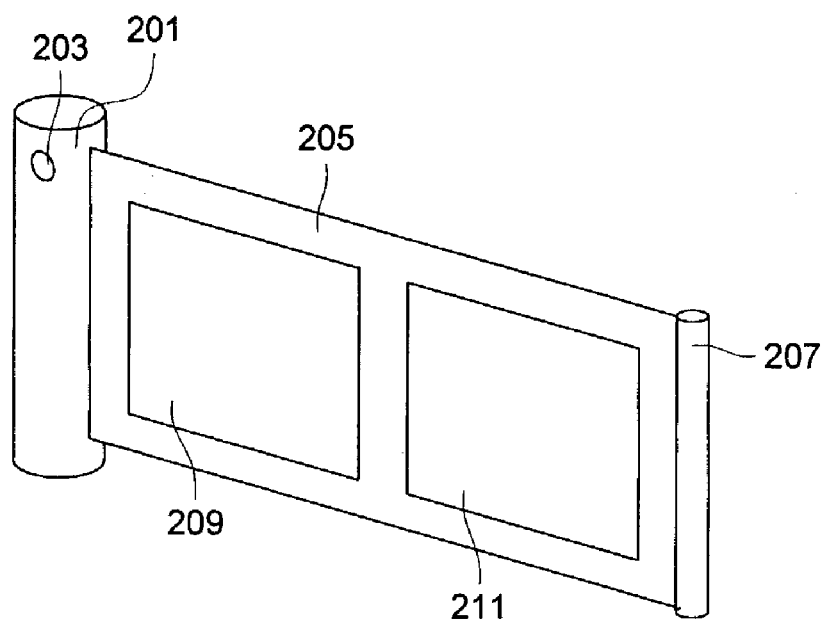
FIGS. 17(*a*) and 17(*b*) are views for explaining Embodiment 11.
Figure 17:
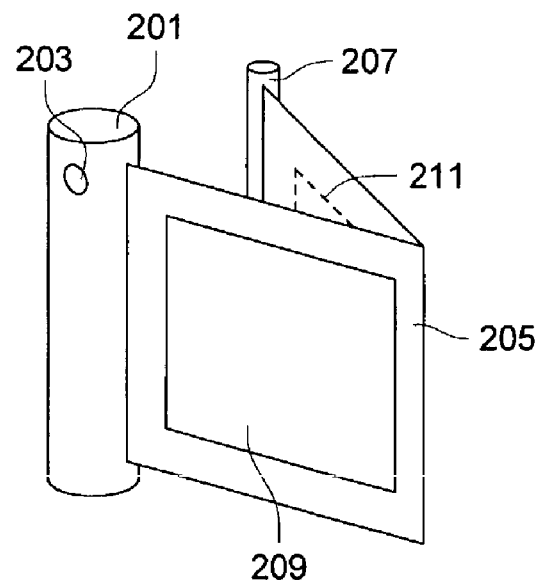

Referring to FIGS. 17(*a*) and 17(*b*) showing Embodiment 11, the explain will be made. In FIG. 17(*a*), the photographing lens 203 is provided on the camera main body portion 201. One end portion side of the flexible display 205 is attached to the camera main body portion 201, and this display 205 can be taken-up around the camera main body portion 201.

To the other hand end portion of the display 205, the grip portion 207 is provided. Then, in the display 205 of the present invention, on the surface of the object side, two display sections 209 and 211 on which the same images are displayed are provided along the feed-out direction of the display 205.

According to the above-described structure, because the display 205 has the flexibility and can be taken-up around the camera main body portion 201, the camera becomes compact, and is handy to carry. The display 205 has 2 display portions 209 and 211 along its feed-out direction. When the display 205 is fed-out, as shown in FIG. 17(*b*), when the display section 211 of the leading edge side is bent so that it can be visually confirmed from the photographer side, the image to be photographed can be confirmed not only from the photographer, but also from the object.

Hereupon, the present invention is not limited to the above-described embodiment. In the above-described embodiment, two display sections 209 and 211 are provided on the surface of the object side of the display 205, however, two display sections may also be provided on the surface of the photographer side. In this case, when the display section of the leading edge side is bent so that it can be visually confirmed from the object side, the same effect can be obtained.

Embodiment 12

Figure 18:
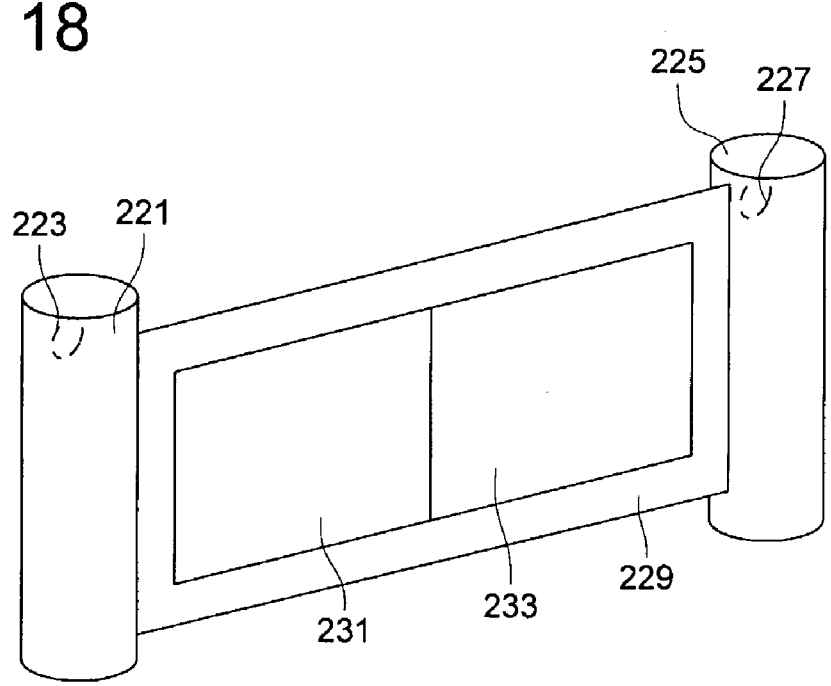
FIG. 18 is a view for explaining Embodiment 12.

Referring to FIG. 18 showing Embodiment 12, the explanation will be made. In the view, numeral 221 is the first camera main body portion having the first photographing lens 223. Numeral 225 is the second camera main body portion having the second photographing lens 227.

One end of the flexible display 229 is attached to the first camera main body portion 221, and the other hand end portion side is attached to the second camera main body portion 225. Then, this display 229 can be taken-up around at least any camera main body portion of the first camera main body portion 221 or second camera main body portion 225. Further, the first display section 231 on which the image photographed by the first photographing lens 223 is displayed, and the second display section 233 on which the image photographed by the second photographing lens 227 is displayed, are continuously formed from the first camera main body portion 221 toward the second camera main body portion 225 on the display 229.

According to the above-described structure, because the display 229 whose one end is attached to the first camera main body portion 221, and the other hand end portion is attached to the second camera main body portion 225, and the display 229 can be taken-up around at least any camera main body portion of the first camera main body portion 221 or second camera main body portion 225, the camera becomes compact, and is handy to carry.

Further, because the camera has the first photographing lens 223 and the second photographing lens 227, the panorama image which is photographed normally by dividing it at two times and obtained by composing the images, and whose angle of view is wide, can be photographed at one time, and the joint of the images becomes easy.

Embodiment 13

Figure 19:
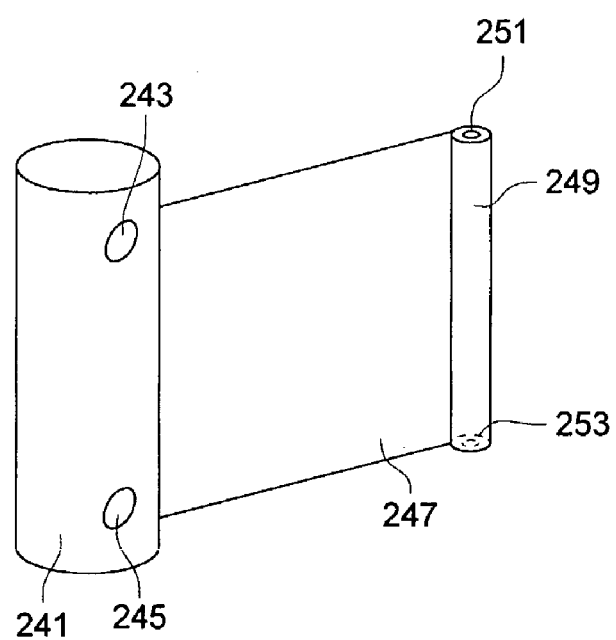
FIG. 19 is a view for explaining Embodiment 13.

Referring to FIG. 19 showing Embodiment 13, the explanation will be made below. In FIG. 19, on one end of the columnar camera main body potion 241, the first photographing lens 243, and on the other hand end portion side, the second photographing lens 245 are provided. The one hand end portion of the flexible display 247 is attached to the camera main body portion 241, and can be taken-up around the camera main body portion 241.

To the other hand end portion of the display 247, the grip portion 249 is attached. On the one end of the grip portion 249, the first release 251, and on the other hand end portion side, the second release 253 are provided.

According to such a structure, because the display 247 has the flexibility, and can be taken-up around the camera main body portion 241, the camera becomes compact, and is handy to carry. Further, because the right handed photographer photographs by using the first photographing lens 243 and the first release 251, and the left handed photographer can photograph by using the second photographing lens 245 and the second release 253, the operability is good.

Figure 20:
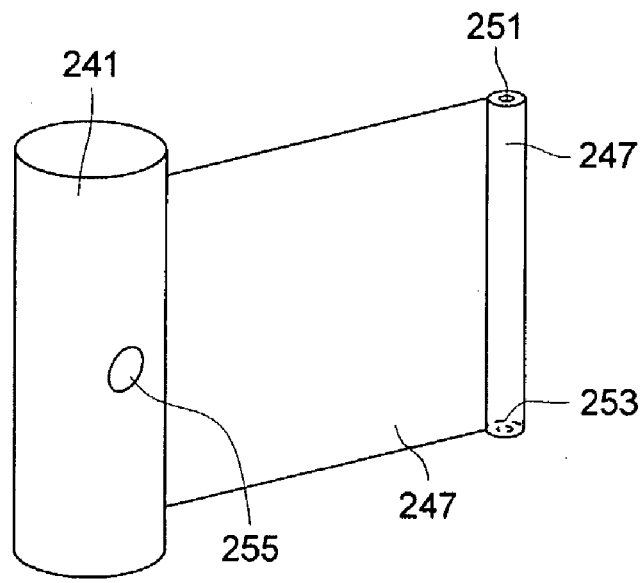
FIG. 20 is a view for explaining a variation of Embodiment 13.

Hereupon, the present invention is not limited to the above-described embodiment. For example, as shown in FIG. 20, also when the photographing lens 255 is provided at the center of the camera main body portion 241; the same effect as the above-described embodiments can be obtained.

Embodiment 14

Figure 21:
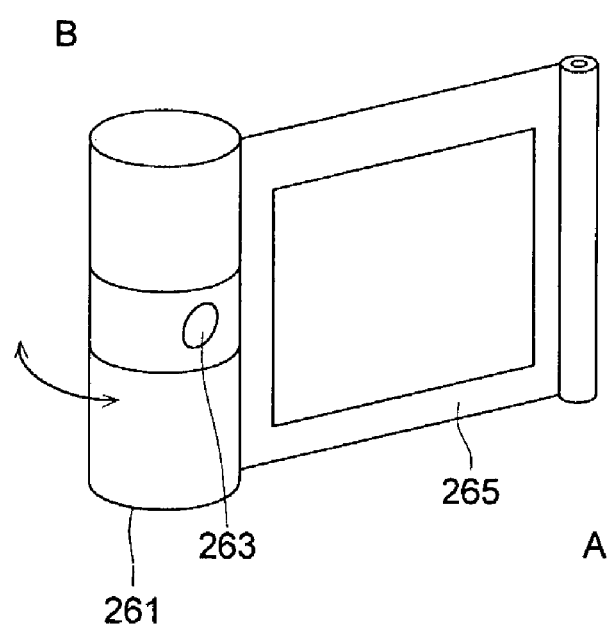
FIG. 21 is a view for explaining Embodiment 14.

Referring to FIG. 21 showing Embodiment 14, the explanation will be made below. The photographing lens 263 is provided at the central portion of the columnar camera main body portion 261. One hand end portion of the flexible display 265 is attached to the camera main body portion 261, and can be taken-up around the camera main body portion 261.

To the other end of the display 265, the grip portion 267 is attached. On the grip portion 267, the release 269 is provided. Then, the photographing lens 263 of the present embodiment can be rotated in the peripheral direction.

Further, the display 265 is a transmission type display, and on both surfaces, images can be displayed. Hereupon, the reflection type display may also be provided on both surfaces. According to the above-described structure, because the display 265 has the flexibility, and can be taken-up around the camera main body portion 261, the camera becomes compact, and is handy to carry.

The condition shown in FIG. 21 is the case where the left handed photographer photographs the object on A side. Herein, when the photographing lens 263 is rotated by 180°, it becomes a case where the right handed photographer photographs the object on B side.

That is, when the photographing lens which can be rotated in the peripheral direction, is provided at the intermediate portion of the camera, and on both surfaces of the display 265, images are displayed, by rotating the photographing lens by 180°, it becomes a camera with the good operability also for the right handed photographer or for the left handed photographer.

Embodiment 15

Figure 22:
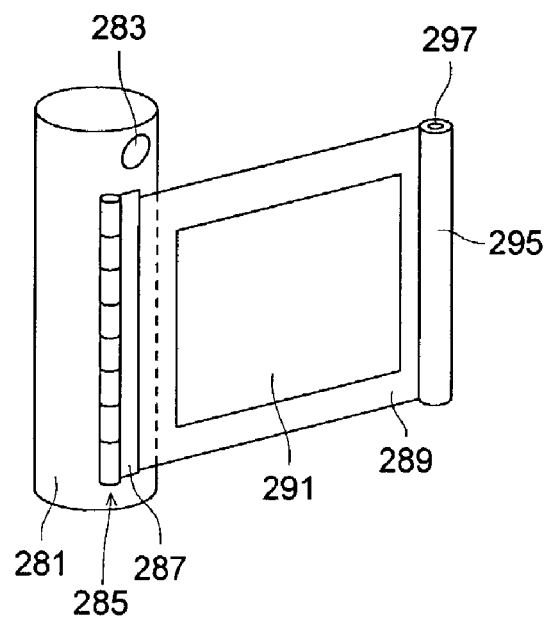
FIGS. 22(*a*) and 22(*b*) are views for explaining Embodiment 15.
Figure 22:
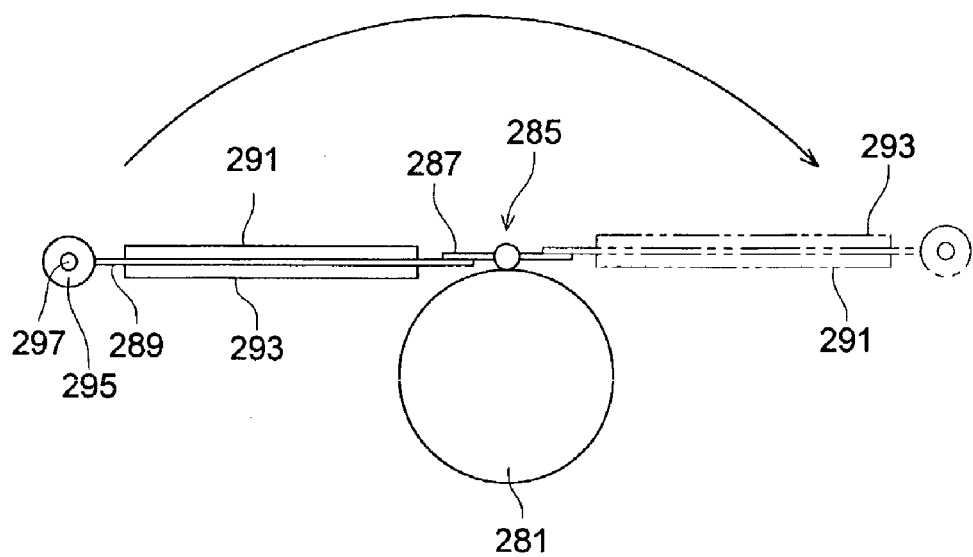
Figure 23:
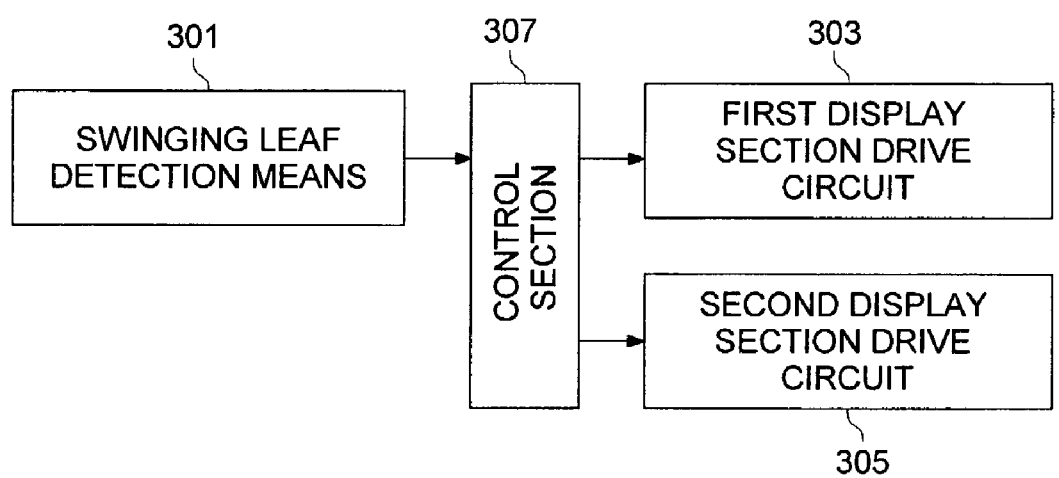
FIG. 23 is a view for explaining the electric structure of the camera shown in FIGS. 22(*a*) and 22(*b*).

Referring to FIGS. 22(a) and 22(b) showing Embodiment 15, the explanation will be made below. Hereupon, FIG. 22(a) is a perspective view, and FIG. 22(b) is a view in which FIG. 23(a) is viewed from above.

The photographing lens 283 is provided at the upper portion of the columnar camera main body portion 281. Further, a hinge means 285 is provided on the camera main body portion 281, and to a swinging leaf (movable portion) 287 of this hinge means 285, one hand end portion of the flexible display 289 is attached. Then, the reflection type first display section 291 and second display section 293 are formed on both surfaces of the display 289, and the display 289 can be taken-up around the camera main body portion 281.

To the other end of the display 289, the grip portion 295 is attached. On the grip portion 295, the release 297 is provided. Next, referring to FIG. 23, the electric structure of the above-described camera will be described.

Numeral 301 is a swinging leaf detection means for detecting the fall-down direction of the swinging leaf 287 on the display side of the hinge means 285. Numeral 307 is the control section for taking-in a signal from the swinging leaf detection means 301 and judging in whether direction the display 289 is to the camera main body portion 281, and driving the drive circuit of the display section on the photographer side in the first display section 291 which the first display section drive circuit 303 drives, and the second display section 293 which the second display section drive circuit 305 drives.

Operations of the above-described structure will be explained below. In FIG. 22(b), when the left handed photographer brings down the display 289 on the solid line position, by the signal from the swinging leaf detection means 301, the control section 397 judges that the display 289 is on the left side of the camera main body portion 281 when viewed from the photographer, drives the second display section drive circuit 305 and displays the image on the second display section 293 which is the display section on the photographer side.

Inversely, in FIG. 22(b), when the right handed photographer brings down the display 289 on the two-dotted chain line position, by the signal from the swinging leaf detection means 301, the control section 307 judges that the display 289 is on the right side of the camera main body portion 281 when viewed from the photographer, drives the first display section drive circuit 303 and displays the image on the first display section 291 which is the display section on the photographer side.

According to the above-described structure, because the display 289 has the flexibility and can be taken-up around the camera main body portion 281, the camera becomes compact and is handy to carry. The direction of the display 289 to the camera main body portion 281 in the case where the right handed photographer photographs and the direction of the display 289 to the camera main body portion 281 in the case where the left handed photographer photographs are reverse to each other, however, the control section 307 takes in a signal from the swinging leaf detection means 301, and judges that, in which direction the display 289 is positioned to the camera main body portion, and drives only the display section on the photographer side, thereby, the camera becomes energy saving.

Hereupon, the display section on the object side may also be driven. In this case, the image in which the object is photographed, can be confirmed. Furthermore, the display 289 may also be a translucent display. By using the translucent display, it is not necessary that the independent displays 291 and 293 are provided on both surfaces of the display 298, thereby, the cost down can be attained.

Further, when the translucent display is driven, it is preferable that the image of the object side is the image in which the image on the photographer side is reversed. Furthermore, a self photographing mode is provided, and when the self photographing mode is selected, the control section takes in a signal from the swinging leaf detection means and judges that, in which direction the display is positioned to the camera main body portion, and may also drive only the display section on the photographer side.

As the flexible display in each of above-described embodiments, there is a display which is thin and light like as the paper, and in which a display image is maintained even when the power source is turned off, so-called an electronic paper (e-paper).

Further, as the electronic paper system, there is a system in which a cholesteric liquid crystal is used, multicolor micro-capsule is rotated, red, green and blue liquid crystal layers are superimposed, attraction and separation of the toner between two layers is used, or the organic EL is light emitted on the film, however, it is not limited to that.

Further, as the camera, there is a digital camera in which the image pick-up element such as CCD is used, or a silver halide camera in which the silver halide film is used, however, it is not limited to that.

As described above, according to Structure (12), because the display has the flexibility and can be taken-up around the camera main body portion, the camera becomes compact and is handy to carry.

Further, when the flexible solar battery is provided on the surface opposite to the display surface of the display, the light receiving surface of the solar battery can be secured broad, and the solar battery becomes high capacity.

Further, the electricity generated by the solar battery is stored in a battery, and by the electric power of the battery, the back-light of the display which is lighted in a dark environment, may also be driven.

According to the Structure (13), because the display has the flexibility and can be taken-up around the camera main body portion, the camera becomes compact and is handy to carry. When the solar battery is provided on the same surface as the display surface of the display, because, in the front-lighted condition in which normally the photographing is often conducted, the sun light is incident on the light receiving surface of the solar battery, the efficiency of the solar battery becomes good.

Further, the electricity generated by the solar battery is stored in a battery, and by the electric power of the battery, the back-light of the display which is lighted in a dark environment, may also be driven.

According to Structure (14), because the display has the flexibility and can be taken-up around the camera main body portion, the camera becomes compact and is handy to carry. As the flexible solar battery is provided on the upper side of the display, which is bendable toward the front surface and the rear surface of the display and flexible, the camera is structured so that, normally, the sun light radiates on the solar battery by bending it to the surface in the opposite direction to the display surface of the display.

In the case where the display surface of the display can not be visually confirmed because it is glared by the outdoor daylight, when the solar battery is bent to the display surface side of the display, and is made a hood, the visual confirmation property of the display 47 is increased.

Further, the electricity generated by the solar battery is stored in a battery, and this system may also be structured so that the back-light of the display which is lighted in the dark environment, is driven by the electric power of the battery.

According to Structure (15), when the back-light of the display whose power consumption is large, is driven by the solar battery, the drive time of the camera becomes long.

Further, the electricity generated by the solar battery is stored in a battery, and this system may also be structured so that the back-light of the display which is lighted in the dark environment, is driven by the electric power of the battery.

According to Structure (16), because the display has the flexibility and can be taken-up around the camera main body portion, the camera becomes compact and is handy to carry. When a natural lighting portion for the display is provided on the opposite side surface to the display surface of the display, the visual confirmation property of the display is increased.

According to Structure (17), because the display has the flexibility and can be taken-up around the camera main body portion, the camera becomes compact and is handy to carry. When the display is a type in which the display image is maintained even when the power source is tuned off, by using the display support mechanism, when the display is supported in the stretched condition, the camera becomes a photograph stand.

According to Structure (18), because the display has the flexibility and can be taken-up around the camera main body portion, the camera becomes compact and is handy to carry.

When the outer peripheral surface of the camera main body portion is taken-up so that the photographing lens is covered by the display, the protection of the photographing lens at the time of no-use of the camera can be achieved.

According to Structure (19), because the display has the flexibility and can be taken-up around the camera main body portion, the camera becomes compact and is handy to carry.

When the camera has the display take-up detection means for detecting that the display is taken-up around the camera main body portion, and the control section for receiving a signal from the display take-up detection means and turning on and off of the power source, because the photographing can be conducted immediate after the display taken-up around the camera main body portion is fed-out, the operability is good.

Further, when the display is taken-up around the camera main body portion, because the power source is turned off, the operability is good, and there is no possibility that it is forgotten to turn off the power source, and the camera results in the power saving.

According to Structure (21), because the display has the flexibility and can be taken-up around the camera main body portion, the camera becomes compact and is handy to carry.

Because the photographing lens is structured so that it can move between the first position at which the photographing of the axial direction of the camera main body portion can be conducted, and the second position at which the photographing of the display surface direction of the fed-out display can be conducted, even when the zoom lens which is long in the optical axis direction is used, the camera becomes compact.

The control section takes in a signal from the display take-up and feed-out amount detection means, and when the display is fed-out, it drives the photographing lens drive means, and moves the photographing lens to the second position, and under the condition that the display is taken-up, it takes in the signal from the photographing lens position detection means, and when the photographing lens is moved to the second position, it drives the display take-up and feed-out detection means, and feeds-out the display, that is, when the display is fed-out, it moves the photographing lens to the second position, and when the photographing lens is moved to the second position, the display is fed-out, thereby, the operability becomes good.

According to Structure (21), because the display has the flexibility and can be taken-up around the camera main body portion, the camera becomes compact and is handy to carry.

Because the different image is displayed every when the display taken-up around the camera main body portion is fed-out, when the camera is used as the photograph stand, the switch of the photograph can be conducted by an easily understandable operation. Further, this camera is used as the photographic album, because the photographs are switched by an operation similar to the turning of the page, the camera becomes a useful photographic album.

According to Structure (22), because the display has the flexibility and can be taken-up around the camera main body portion, the camera becomes compact and is handy to carry.

When the flexible display is the transmission type display, the image can be confirmed not only by the photographer, but also from a object.

According to Structure (23), because the display has the flexibility and can be taken-up around the camera main body portion, the camera becomes compact and is handy to carry.

The display has two display sections along is feed-out direction, and when the display is fed-out, by bending one hand display section so that it can be visually confirmed from the object side, the image to be photographed can be confirmed not only by the photographer, but also by the object.

According to Structure (24), one end of the display is attached to the first camera main body portion, and the other hand end portion is attached to the second camera main body portion, and because the display can be taken-up around at least either camera main body portion of the first camera main body portion or the second camera main body portion, the camera becomes compact, and is handy to carry.

Because the camera has the first photographing lens and the second photographing lens, the panorama image which, normally, is photographed by dividing at two times and obtained by composing images, and whose field angle is wide, can be photographed at one time, and also the splicing of the image planes becomes easy.

According to Structure (25), because the display has the flexibility and can be taken-up around the camera main body portion, the camera becomes compact and is handy to carry.

When the first photographing lens is provided on one hand end portion of the camera main body portion, and the second photographing lens is provided on the other end portion, and the first release is provided on the one end portion of the grip portion, and the second release is provided on the other end portion, because the right handed photographer can photograph by using the first photographing lens and the first release, and the left handed photographer can photograph by using the second photographing lens and the second release, the operability is good.

According to Structure (26), because the display has the flexibility and can be taken-up around the camera main body portion, the camera becomes compact and is handy to carry.

When the photographing lens rotatable in the peripheral direction is provided at the intermediate portion of the camera main body portion, and the images are displayed on both surfaces of the display, and the photographing lens is rotated by 180°, the operability becomes good also for the right handed photographer, and for the left handed photographer.

According to Structure (27), because the display has the flexibility and can be taken-up around the camera main body portion, the camera becomes compact and is handy to carry.

The direction of the display to the camera main body portion when the right handed photographer photographs, and the direction of the display to the camera main body portion when the left handed photographer photographs are opposite to each other, however, when the control section takes in a signal from the swinging leaf detection means and judges that, in which direction the display is positioned to the camera main body portion, and drives only the display section of the photographer side, the camera becomes energy saving.

Further, also the display section of the object side may be driven. In this case, the object can confirm the image to be photographed. Furthermore, the self photographing mode is provided, and when the self photographing mode is selected, the control section takes in a signal from the swinging leaf detection means, and judges that, in which direction the display is positioned to the camera main body portion, and may also drive only the display section of the photographer side.

According to Structure (28), when the translucent display is used, it is not necessary that the independent display sections are provided on both surfaces of the display, and the cost reduction can be achieved. Hereupon, when the translucent display is driven, it is preferable for the image on the object side that the image on the photographer side is reversed.

According to Structure (29), when the display sections are formed on both surfaces of the display; a means for reversing the image is not necessary.

What is claimed is:

1. A camera comprising:
   (a) a columnar camera main body portion having a photographing lens;
   (b) a flexible display for displaying an image of an object to be photographed through the photographing lens, in which one end of the flexible display is attached to the camera main body portion, and which is adapted to be taken-up into the camera main body portion;
   (c) a first detector for detecting that the display taken-up into the camera main body portion is fed-out;
   (d) a second detector for detecting that the display is perfectly taken-up into the camera main body portion; and
   (e) a controller for taking-in a signal of the first detector and the second detector, and for driving the display, wherein when the display is not perfectly taken-up in a fixed period of time after a signal from the second detector is taken in and the taking-up is started, the controller stops the taking-up and puts the camera in a power saving mode.

2. The camera of claim 1, further comprising a feed-out device for feeding out the display from the camera main body portion, wherein after the display is taken-up, the controller drives the feed-out device according to a condition change.

3. The camera of claim 2, wherein the condition change is any one of a time when an interval photographing is conducted, a time when a reserved photographing is conducted, a time when a trigger signal from the outside is inputted, or a time when an interval reproducing is conducted.

* * * * *